(12) United States Patent
Cote et al.

(10) Patent No.: US 9,843,813 B2
(45) Date of Patent: *Dec. 12, 2017

(54) DELAYED CHROMA PROCESSING IN BLOCK PROCESSING PIPELINES

(71) Applicant: Apple Inc., Cupertino, CA (US)

(72) Inventors: Guy Cote, San Jose, CA (US); Craig M. Okruhlica, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/050,061

(22) Filed: Feb. 22, 2016

(65) Prior Publication Data

US 2016/0173885 A1 Jun. 16, 2016

Related U.S. Application Data

(63) Continuation of application No. 14/037,310, filed on Sep. 25, 2013, now Pat. No. 9,270,999.

(51) Int. Cl.
 *H04N 19/40* (2014.01)
 *H04N 19/186* (2014.01)
 (Continued)

(52) U.S. Cl.
 CPC ......... *H04N 19/186* (2014.11); *H04N 19/107* (2014.11); *H04N 19/13* (2014.11);
 (Continued)

(58) Field of Classification Search
 CPC .... H04N 19/107; H04N 19/13; H04N 19/159; H04N 19/176; H04N 19/182;
 (Continued)

(56) References Cited

U.S. PATENT DOCUMENTS

| 5,603,012 A | * | 2/1997 | Sotheran | G06F 9/3867 370/450 |
| 5,724,537 A | * | 3/1998 | Jones | G06F 12/0207 375/E7.094 |

(Continued)

FOREIGN PATENT DOCUMENTS

| JP | H11-134203 | 5/1999 |
| WO | 2013107906 | 7/2013 |

OTHER PUBLICATIONS

Lee et al, Pipelined Intra Prediction Using Shuffled Encoding Order for H.264/AVC, 2006.*

(Continued)

*Primary Examiner* — Shan Elahi
(74) *Attorney, Agent, or Firm* — Robert C. Kowert; Meyertons, Hood, Kivlin, Kowert & Goetzel, P.C.

(57) ABSTRACT

A block processing pipeline in which macroblocks are input to and processed according to row groups so that adjacent macroblocks on a row are not concurrently at adjacent stages of the pipeline. The input method may allow chroma processing to be postponed until after luma processing. One or more upstream stages of the pipeline may process luma elements of each macroblock to generate luma results such as a best mode for processing the luma elements. Luma results may be provided to one or more downstream stages of the pipeline that process chroma elements of each macroblock. The luma results may be used to determine processing of the chroma elements. For example, if the best mode for luma is an intra-frame mode, then a chroma processing stage may determine a best intra-frame mode for chroma and reconstruct the chroma elements according to the best chroma intra-frame mode.

20 Claims, 15 Drawing Sheets

(51) Int. Cl.

| | |
|---|---|
| *H04N 19/42* | (2014.01) |
| *H04N 19/159* | (2014.01) |
| *H04N 19/176* | (2014.01) |
| *H04N 19/107* | (2014.01) |
| *H04N 19/436* | (2014.01) |
| *H04N 19/13* | (2014.01) |
| *H04N 19/182* | (2014.01) |
| *H04N 19/423* | (2014.01) |
| *H04N 19/52* | (2014.01) |
| *H04N 19/593* | (2014.01) |
| *H04N 19/86* | (2014.01) |
| *H04N 19/96* | (2014.01) |

(52) U.S. Cl.
CPC ......... *H04N 19/159* (2014.11); *H04N 19/176* (2014.11); *H04N 19/182* (2014.11); *H04N 19/40* (2014.11); *H04N 19/423* (2014.11); *H04N 19/436* (2014.11); *H04N 19/439* (2014.11); *H04N 19/52* (2014.11); *H04N 19/593* (2014.11); *H04N 19/86* (2014.11); *H04N 19/96* (2014.11)

(58) Field of Classification Search
CPC .... H04N 19/186; H04N 19/40; H04N 19/423; H04N 19/436; H04N 19/439; H04N 19/52; H04N 19/593; H04N 19/86; H04N 19/96
USPC .................................................. 375/240.16
See application file for complete search history.

(56) References Cited

U.S. PATENT DOCUMENTS

| | | | |
|---|---|---|---|
| 6,005,624 A | 12/1999 | Vainsencher | |
| 6,411,730 B1* | 6/2002 | Bartell | H04N 1/644 358/522 |
| 7,725,745 B2 | 5/2010 | Gabor et al. | |
| 7,768,520 B2 | 8/2010 | Deb | |
| 7,822,116 B2 | 10/2010 | Hinds | |
| 7,929,599 B2 | 4/2011 | Ganesh et al. | |
| 8,068,545 B2 | 11/2011 | Penna et al. | |
| 8,213,511 B2 | 7/2012 | Swami et al. | |
| 8,284,844 B2 | 10/2012 | Macinnis et al. | |
| 8,320,448 B2 | 11/2012 | Zhao et al. | |
| 8,379,718 B2 | 2/2013 | Wang et al. | |
| 8,488,673 B2 | 7/2013 | Dencher | |
| 8,532,383 B1 | 9/2013 | Thakkar et al. | |
| 9,270,999 B2* | 2/2016 | Cote | H04N 19/439 |
| 2001/0048720 A1* | 12/2001 | Koshiba | H04N 19/80 375/240.16 |
| 2003/0196078 A1* | 10/2003 | Wise | G06F 9/3867 712/300 |
| 2003/0198291 A1* | 10/2003 | Gold | H04N 19/61 375/240.01 |
| 2004/0042669 A1 | 3/2004 | Jeon et al. | |
| 2004/0258157 A1 | 12/2004 | Xu et al. | |
| 2005/0169371 A1 | 8/2005 | Lee et al. | |
| 2006/0056513 A1 | 3/2006 | Shen et al. | |
| 2006/0078052 A1 | 4/2006 | Dang | |
| 2006/0126740 A1 | 6/2006 | Lin et al. | |
| 2008/0148706 A1 | 6/2008 | Beauregard | |
| 2008/0170611 A1 | 7/2008 | Ramaswamy | |
| 2009/0003446 A1* | 1/2009 | Wu | H04N 19/176 375/240.16 |
| 2009/0144527 A1 | 6/2009 | Nakata et al. | |
| 2009/0310678 A1* | 12/2009 | Tanaka | H04N 19/593 375/240.15 |
| 2010/0053304 A1 | 3/2010 | Underkoffler et al. | |
| 2010/0060651 A1 | 3/2010 | Gala | |
| 2010/0135383 A1 | 6/2010 | Zhao et al. | |
| 2010/0142623 A1 | 6/2010 | Vaduganathan et al. | |
| 2011/0228858 A1* | 9/2011 | Budagavi | H04N 19/70 375/240.25 |
| 2011/0298890 A1* | 12/2011 | Bacche | H04N 9/78 348/43 |
| 2012/0014439 A1 | 1/2012 | Segall et al. | |
| 2012/0076207 A1 | 3/2012 | Schmit et al. | |
| 2012/0099657 A1 | 4/2012 | Tanaka et al. | |
| 2012/0114039 A1* | 5/2012 | Wang | H04N 19/197 375/240.13 |
| 2012/0140822 A1 | 6/2012 | Wang et al. | |
| 2012/0163453 A1 | 6/2012 | Horowitz | |
| 2012/0287995 A1 | 11/2012 | Budagavi | |
| 2013/0003837 A1 | 1/2013 | Yu et al. | |
| 2013/0182774 A1 | 7/2013 | Wang et al. | |
| 2013/0188702 A1 | 7/2013 | Li et al. | |
| 2014/0169479 A1* | 6/2014 | Oga | H04N 19/91 375/240.18 |
| 2014/0334559 A1* | 11/2014 | Kim | H04N 19/91 375/240.29 |
| 2015/0091914 A1* | 4/2015 | Cote | G06T 1/20 345/506 |

OTHER PUBLICATIONS

Jin et al, An Efficient Pipelined Architecture for H.264/AVC Intra Frame Processing, 2007.*
Cheung et al, Highly Parallel Rate-Distortion Optimized Intra-Mode Decision on Multicore Graphics Processors, Nov. 2009.*
He et al, A New Architecture for High Performance Intra Prediction in H.264 Deecoder, Dec. 7-9, 2009.*
Zhu et al, H.264 Video Parallel Decoder on a 24-Core Processor, 2013.*
Siblini et al, Efficient FPGA Implementation of H.264 CAVLC Entropy Decoder, 2013.*
Chen et al, Architecture Design of Context-Based Adaptive Variable-Length Coding for H.264/AVD, Sep. 2006.*
U.S. Appl. No. 14/037,316, filed Sep. 25, 2013, Craig M. Okruhlica, et al.
U.S. Appl. No. 14/039,764, filed Sep. 27, 2013, Timothy John Millet.
U.S. Appl. No. 14/037,313, filed Sep. 25, 2013, Joseph J. Cheng, et al.
U.S. Appl. No. 14/039,729, filed Sep. 27, 2013, James E. Orr et al.
U.S. Appl. No. 14/037,820, filed Sep. 27, 2013, Guy Cote, et al.
ITU-T H2.64 "Series H: Audiovisual and Multimedia Systems Infrastructure of Audiovisual Services—Coding of Moving Video—Advanced video coding for generic audiovisual services" Apr. 2013 pp. 1-732.
Japanese Office Action from Patent Application No. 2016-517549, dated May 16, 2017, Apple Inc., pp. 1-4.

* cited by examiner

DELAYED CHROMA PROCESSING IN BLOCK PROCESSING PIPELINES

This application is a continuation of U.S. patent application Ser. No. 14/037,310, filed Sep. 25, 2013, now U.S. Pat. No. 9,270,099, entitled "Delayed Chroma Processing in Block Processing Pipelines", which is hereby incorporated by reference herein in its entirety.

BACKGROUND

Technical Field

This disclosure relates generally to video or image processing, and more specifically to methods and apparatus for processing digital video frames in block processing pipelines.

Description of the Related Art

Various devices including but not limited to personal computer systems, desktop computer systems, laptop and notebook computers, tablet or pad devices, digital cameras, digital video recorders, and mobile phones or smart phones may include software and/or hardware that may implement a video processing method. For example, a device may include an apparatus (e.g., an integrated circuit (IC), such as a system-on-a-chip (SOC), or a subsystem of an IC), that may receive and process digital video input from one or more sources and output the processed video frames according to one or more video processing methods. As another example, a software program may be implemented on a device that may receive and process digital video input from one or more sources and output the processed video frames according to one or more video processing methods. As an example, a video encoder 10 as shown in FIG. 1 represents an apparatus, or alternatively a software program, in which digital video input (input frames 90) is encoded or converted into another format (output frames 92), for example a compressed video format such as H.264/Advanced Video Coding (AVC) format (also referred to as MPEG 4 Part 10), according to a video encoding method. An apparatus or software program such as a video encoder 10 may include multiple functional components or units, as well as external interfaces to, for example, video input sources and external memory.

In some video processing methods, to perform the processing, each input video frame 90 is divided into rows and columns of blocks of pixels (e.g., 16×16 pixel blocks), for example as illustrated in FIG. 2 which shows an example 192×192 pixel frame divided into 144 16×16 pixel blocks. Each block of an input video frame 90 is processed separately, and when done the processed blocks are combined to form the output video frame 92. This may be referred to as a block processing method. Conventionally, the blocks are processed by the block processing method in scan order as shown in FIG. 2, beginning at the first block of the first row of the frame (shown as block 0), sequentially processing the blocks across the row, and continuing at the first block of the next row when a row is complete.

A block processing method may include multiple processing steps or operations that are applied sequentially to each block in a video frame. To implement such a block processing method, an apparatus or software program such as a video encoder 10 may include or implement a block processing pipeline 40. A block processing pipeline 40 may include two or more stages, with each stage implementing one or more of the steps or operations of the block processing method. FIG. 1 shows an example video encoder 10 that implements an example block processing pipeline 40 that includes at least stages 42A through 42C. A block is input to a stage 42A of the pipeline 40, processed according to the operation(s) implemented by the stage 42A, and results are output to the next stage 42B (or as final output by the last stage 42). The next stage 42B processes the block, while a next block is input to the previous stage 42A for processing. Thus, blocks move down the pipeline from stage to stage, with each stage processing one block at a time and multiple stages concurrently processing different blocks. Conventionally, the blocks are input to and processed by the block processing pipeline 40 in scan order as shown in FIG. 2. For example, in FIG. 1, the first block of the first row of the frame shown in FIG. 2 (block 0) is at stage 42C, the second block (block 1) is at stage 42B, and the third block (block 2) is at stage 42A. The next block to be input to the block processing pipeline 40 will be the fourth block in the first row.

H.264/Advanced Video Coding (AVC)

H.264/AVC (formally referred to as ITU-T Recommendation H.264, and also referred to as MPEG-4 Part 10) is a block-oriented motion-compensation-based codec standard developed by the ITU-T (International Telecommunications Union-Telecommunication Standardization Sector) Video Coding Experts Group (VCEG) together with the ISO/IEC JTC1 Moving Picture Experts Group (MPEG). The H.264/AVC standard is published by ITU-T in a document titled "ITU-T Recommendation H.264: Advanced video coding for generic audiovisual services". This document may also be referred to as the H.264 Recommendation.

SUMMARY OF EMBODIMENTS

Embodiments of block processing pipelines including multiple stages for processing macroblocks of pixels from a video frame are described in which chroma processing is delayed until after luma processing, and in which at least some chroma processing decisions are based on results of luma processing. Macroblocks may be input to and processed in the pipelines according to row groups so that adjacent macroblocks on a row are not concurrently at adjacent stages of the pipeline. For example, macroblocks may be input to and processed in the pipeline according to a knight's order. The input method may, for example, allow feedback of neighbor data from a downstream stage of the pipeline to an upstream stage, and may allow chroma processing to be postponed until after luma processing.

In at least some embodiments, the stages of the pipeline may include one or more upstream stages that process luma portions of the macroblocks. The luma stages may include a luma intra-frame estimation component that determines a best luma intra-mode for a macroblock according to luma elements from the current frame. Intra-frame estimation for chroma may be delayed until a chroma reconstruction stage. The luma stages may also include a luma inter-frame estimation component that determines a best inter-mode for a macroblock according to luma elements from one or more previously processed reference frames. A mode decision stage determines a best mode for reconstructing the macroblock according to input from the upstream luma stages. One or more downstream luma stages may then perform luma motion compensation and reconstruction for the macroblock according to the output from mode decision. The mode decision stage may also pass results forward to a chroma stage so that reference data for chroma processing may be prefetched from a memory.

After luma motion compensation and reconstruction are performed on the macroblock, one or more downstream chroma stages may perform chroma motion compensation and reconstruction for the macroblock. If the best mode determined by the mode decision stage is an intra-frame mode, then the chroma reconstruction stage may perform intra-frame estimation for chroma to determine a best chroma intra mode, and may then perform reconstruction of the chroma elements of the macroblock according to the determined best chroma intra mode. If the best mode determined by the mode decision stage is an inter-frame mode, then intra-frame estimation is not performed for chroma.

Figure 1:
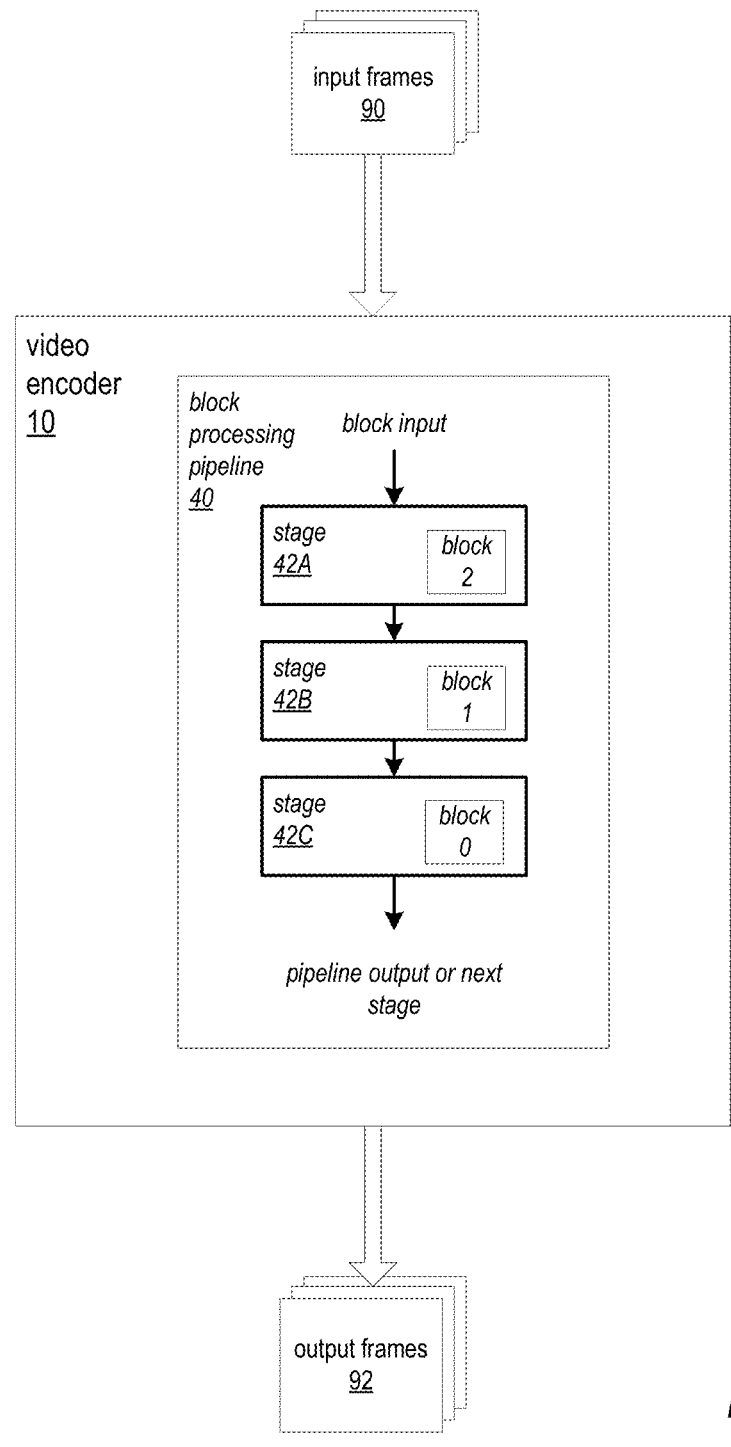
FIG. 1 illustrates an example video encoder including a conventional block processing pipeline that processes blocks from input frames in scan order.
Figure 2:
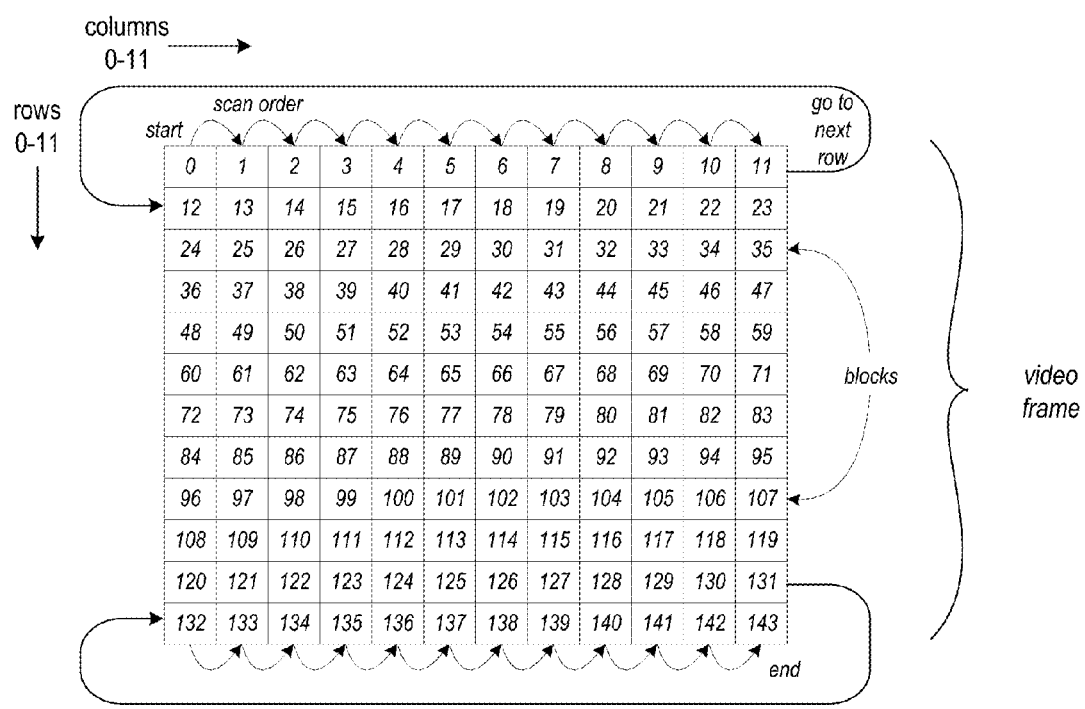
FIG. 2 illustrates conventional scan order processing of blocks from a video frame.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Figure 13:
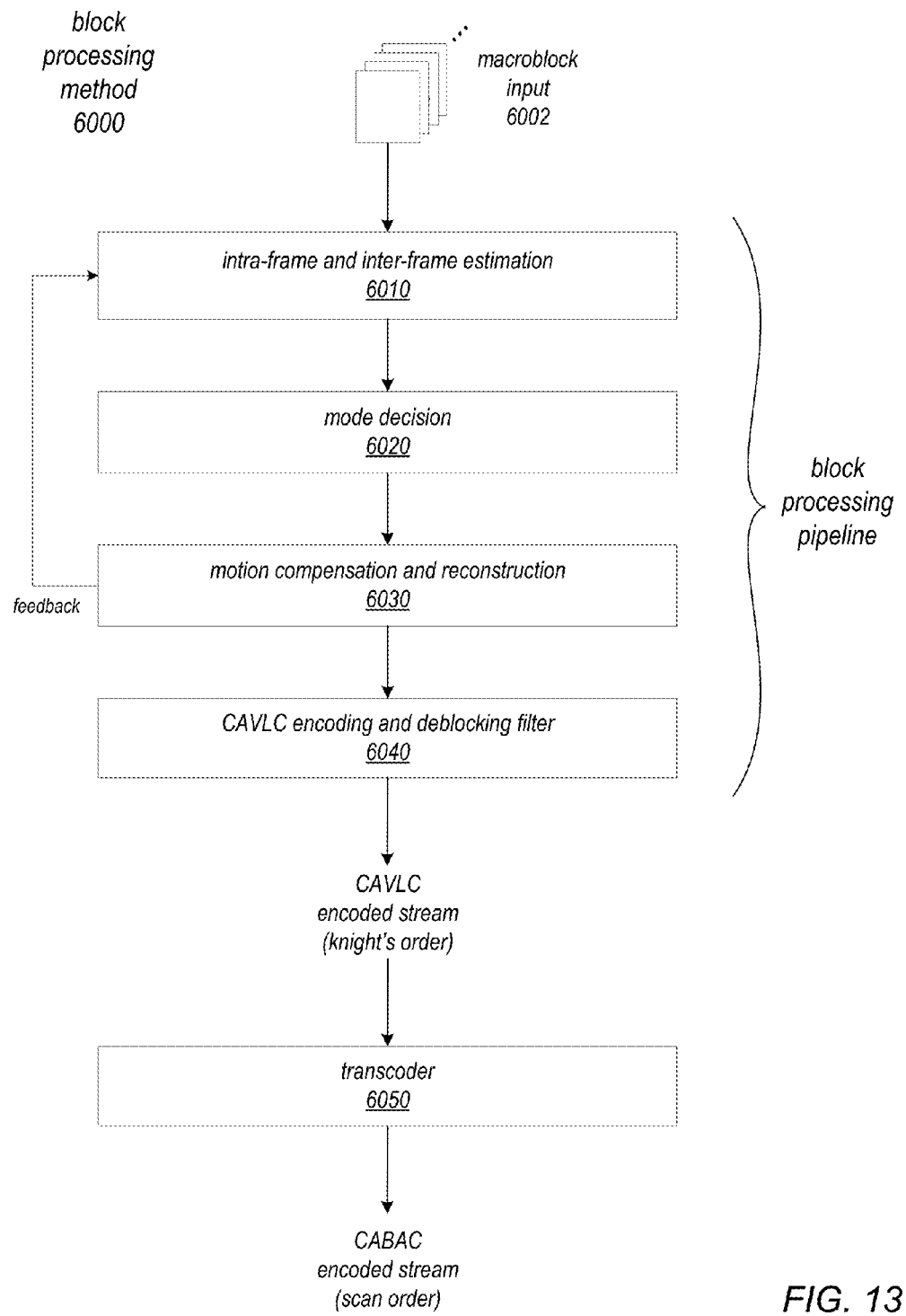
FIG. 13 is a high-level block diagram of general operations in an example block processing method that may be implemented by a block processing pipeline that implements one or more of the block processing methods and apparatus described herein, according to at least some embodiments.
Figure 14:
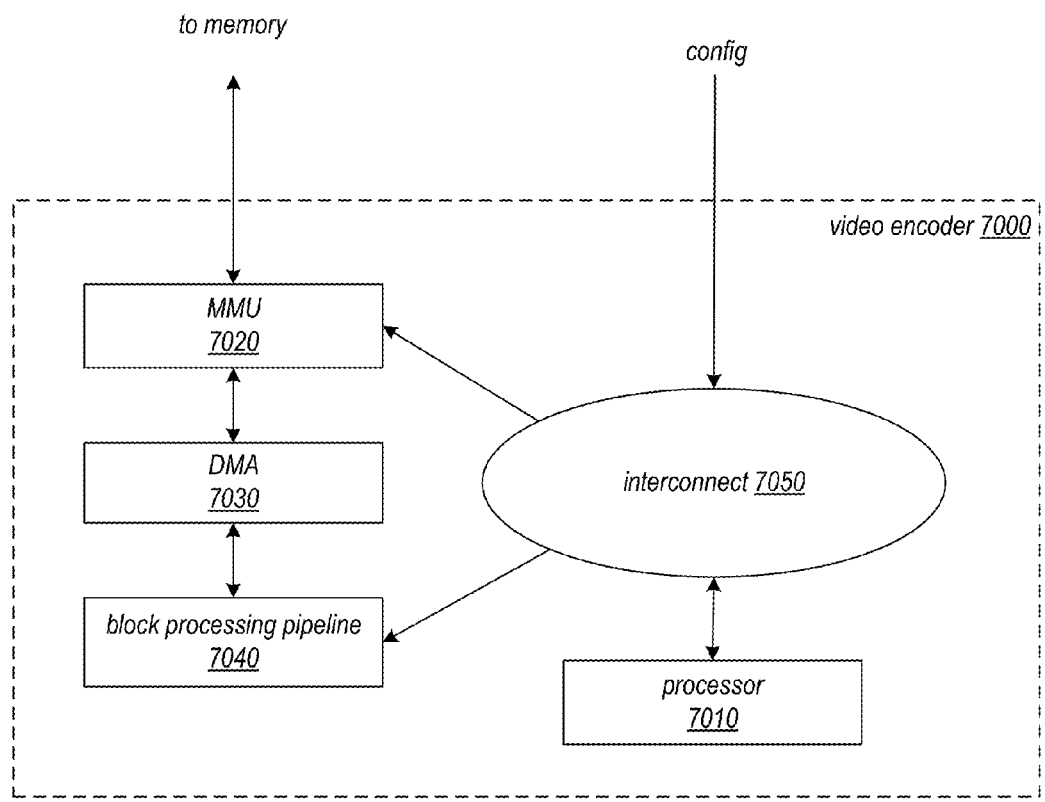
FIG. 14 is a block diagram of an example video encoder apparatus, according to at least some embodiments.

Various embodiments of methods and apparatus for processing digital video frames in block processing pipelines are described. Embodiments of block processing methods and apparatus are generally described herein in the context of video processing in which input video frames are subdivided into and processed according to blocks of elements (e.g., 16×16, 32×32, or 64×64 pixel blocks). Embodiments of an example H.264 video encoder that includes a block processing pipeline and that may implement one or more of the block processing methods and apparatus are described herein. The H.264 video encoder converts input video frames from an input format into H.264/Advanced Video Coding (AVC) format as described in the H.264/AVC standard (the H.264 Recommendation). FIG. 13 illustrates an example block processing pipeline of an example H.264 video encoder, and FIG. 14 illustrates an example H.264 video encoder that includes a block processing pipeline. However, embodiments of the block processing methods and apparatus may be used in encoders for other video encoding formats, for example in block processing pipelines of HEVC (High Efficiency Video Encoding) video encoders that convert input video frames from an input format into HEVC format as described in the HEVC standard. Other video encoders that may use embodiments of the block processing methods and apparatus may include, but are not limited to, H.263, MPEG-2, MPEG-4, and JPEG-2000 video encoders. However, it is to be noted that embodiments of the block processing methods and apparatus may be used in any block processing pipeline, including but not limited to block processing pipelines implemented in various other video encoders and/or decoders (which may be referred to as codecs) in which digital video frames input in one format are encoded or converted into another format. Further note that the block processing methods and apparatus may be used in software and/or hardware implementations of video encoders. In addition to video encoders/decoders, the block processing methods and apparatus described herein may be used in various other applications in which blocks from a video frame or still digital image are processed, for example in pipelines that process still digital images in various image processing applications. Thus, it is to be understood that the term frame or video frame as used herein may also be taken to refer to any digital image.

Embodiments of the block processing methods and apparatus as described herein may be implemented in two or more parallel block processing pipelines. For example, 2, 4, 8, or more pipelines may be configured to run in parallel, with each pipeline processing a quadrow from an input video frame, for example with blocks input according to knight's order.

Embodiments of the block processing methods and apparatus are generally described herein in the context of video processing in which input frames are subdivided into and processed according to blocks of picture elements (referred to as pixels, or pels), specifically 16×16 pixel blocks referred to as macroblocks that are used, for example, in H.264 encoding. However, embodiments may be applied in pipelines in which blocks of other sizes and geometries, or of other elements, are processed. For example, HEVC encoding uses blocks referred to as Coding Tree Units (CTUs) that may vary within the range of 16×16 pixel to 64×64 pixel. In some implementations such as H.264 encoders, the blocks input to the pipeline may be referred to as macroblocks, each macroblock including two or more blocks or partitions that may be processed separately at stages of the pipeline. For example, for input video frames encoded in YUV (e.g., YUV420 format) or YCbCr (e.g., YCbCr 4:2:0, 4:2:2 or 4:4:4 formats) color space, a macroblock may be composed of separate blocks of chroma and luma elements that may be processed separately at stages in a pipeline. In addition to applications that process frames in a pipeline according to blocks of elements (e.g., blocks of pixels), the block processing methods and apparatus may be applied in applications in which digital images (e.g., video frames or still images) are processed by single elements (e.g., single pixels).

Delayed Chroma Processing in Block Processing Pipelines

Embodiments of block processing pipeline methods and apparatus are described in which blocks from the frame are input to the pipeline so that adjacent blocks on a row are not concurrently at adjacent stages of the pipeline. For example, in at least some embodiments, blocks may be input to and processed in the pipeline according to knight's order, for example as described in the section titled Knight's order processing. In at least some embodiments, blocks of pixels from the frame are input and processed according to groups of two or more rows (e.g., in row groups each containing four rows of blocks). For example, the section titled Knight's order processing describes using row group constraints with knight's order input. As an example, using knight's order processing with a quadrow (four row) constraint provides four stages of space between the current block at a stage and its left neighbor block. In other words, when the current block is at a stage that needs the block's left neighbor data to process the block, the left neighbor will be four stages downstream from the stage. Note, however, that other block input and processing orders that provide one or more stages of space between adjacent blocks from a row in the pipeline may be used in some embodiments.

A block processing pipeline input method such as knight's order that provides one or more stages (e.g., four stages) of spacing between adjacent blocks in the pipeline. This spacing, for example, provides latency (e.g., four pipeline cycles) for processing the left neighbor block of a block at downstream stage(s) of the pipeline so that processed pixels from the left neighbor block can be made available at an upstream stage of the pipeline to process the block to the immediate right of the left neighbor block on a row. In contrast, if processing in scan order, the left neighbor block would only be at the next stage of the pipeline, and thus the previous stage that is processing the block to the right would either have to wait for the left neighbor block to be processed at one or more downstream stage(s) or process the block without the reconstructed left neighbor data. An example block processing method that may use neighbor pixels from one or more neighbor blocks is an intra-frame estimation method in an H.264 encoder. Embodiments of an example H.264 encoding pipeline that may implement an intra-frame estimation method is described in the section titled Example block processing pipeline in reference to FIG. 13. In FIG. 13, a motion compensation and reconstruction 6030 component of a pipeline may feed back left neighbor reconstructed pixels to an intra-frame and inter-frame estimation 6010 component of the pipeline.

In some implementations such as H.264 encoders, the blocks input to the pipeline may be 16×16 pixel blocks referred to as macroblocks, each macroblock including two or more blocks or partitions. For example, for input video frames encoded in YUV (e.g., YUV420 format) or YCbCr (e.g., YCbCr 4:2:0, 4:2:2 or 4:4:4 formats) color space, a macroblock may be composed of separate blocks of chroma and luma elements.

A block processing pipeline input method such as knight's order that provides spacing between blocks in the pipeline may be leveraged to provide multiple processing stages that may separately process the luma and chroma elements of each macroblock in the pipeline. In at least some embodiments, separating luma and chroma processing in the pipeline may allow chroma processing to be delayed until after luma processing, which may allow processing decisions to be made based on the luma elements and then applied to the chroma elements. This may, for example, allow certain operations to be applied to the chroma elements if and only if the operations are determined to be necessary according to the luma processing.

Figure 3:
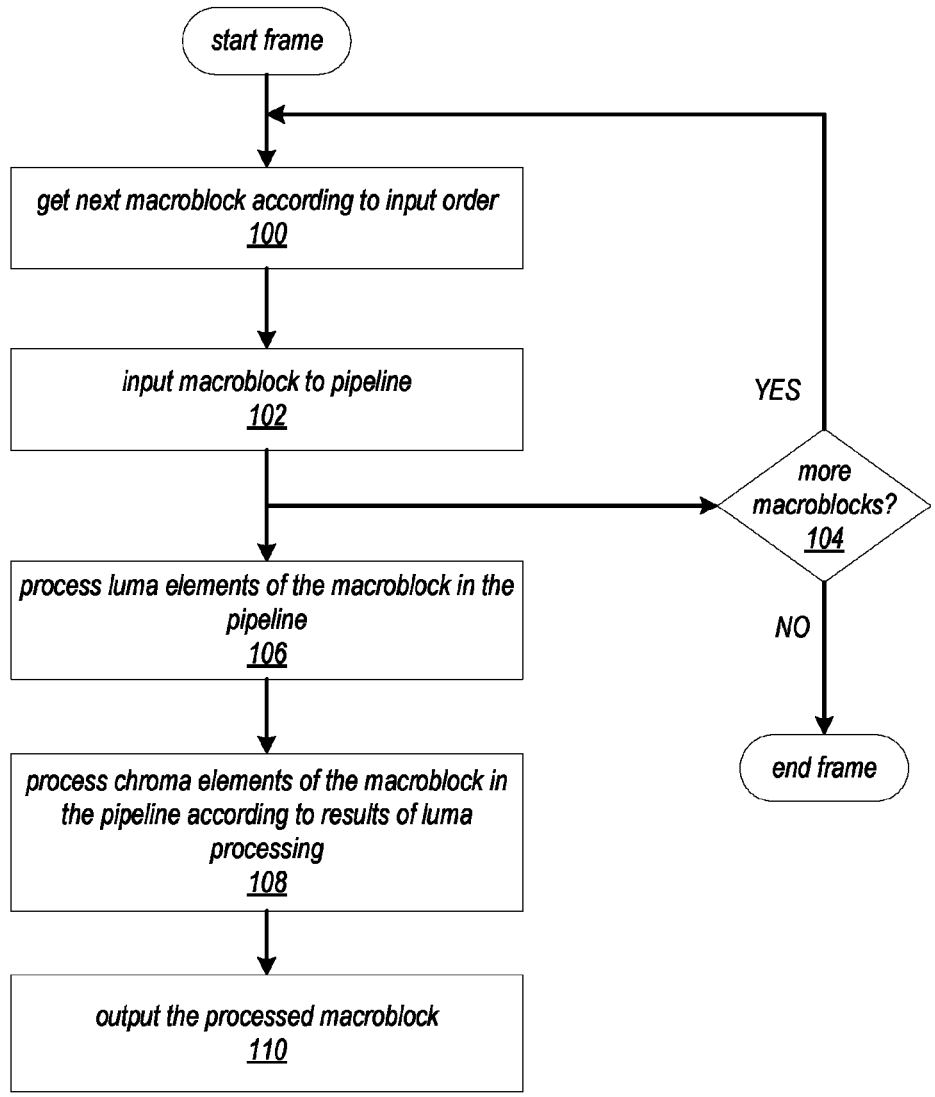
FIG. 3 is a high-level flowchart of a macroblock processing pipeline method in which chroma processing is delayed until after luma processing, according to at least some embodiments.

FIG. 3 is a high-level flowchart of a macroblock processing pipeline method in which chroma processing is delayed until after luma processing, according to at least some embodiments. As indicated at 100, a next macroblock is determined according to a block input order. For example, in some embodiments, a next macroblock may be determined according to a knight's order processing method as described in the section titled Knight's order processing. As indicated at 102, the macroblock is input to the pipeline. As shown by element 104, the macroblock input process of elements 100 and 102 continues as long as there are macroblocks in the current frame to be processed. Each macroblock that is input to the pipeline by elements 100 and 102 is processed in the pipeline beginning at element 106. As indicated at 106, in at least some embodiments, the luma elements of each macroblock may be processed first at one or more luma processing stages of the pipeline. As indicated at 108, chroma elements of the macroblock may then be processed at one or more chroma processing stages of the pipeline according to results of luma processing. As indicated at 110, the fully processed macroblock may be output, for example to an external memory via direct memory access (DMA).

As indicated at 106 and 108 of FIG. 3, in at least some embodiments, the luma elements of each macroblock may be processed first at one or more luma processing stages. Results of luma processing may then be used to determine chroma processing methods to be applied to the chroma elements. For example, in some embodiments, intra-frame estimation may be performed on luma elements of each macroblock to determine blocks of previously encoded pixels within the current frame to be used in encoding the macroblock. Inter-frame estimation may also be performed on the luma elements to find matching pixel blocks in previously processed reference frames. Results of inter-frame and intra-frame estimation are passed to a mode decision stage, which determines a best mode for encoding the macroblock. The best mode may be an intra-frame mode as determined by luma intra-frame estimation or an inter-frame mode as determined by luma inter-frame estimation. One or more luma processing stages may then perform motion compensation and reconstruction for luma based on results of mode decision. Results of luma reconstruction may be passed back to the luma intra-frame estimation component.

Results of mode decision may also be passed forward in the pipeline to one or more chroma processing stages. Based on the results of mode decision, the chroma processing stage(s) may prefetch reference data from memory for use in processing the respective macroblock when it arrives at the chroma processing stage(s). Note that the macroblock passes through one, two or more intermediate luma processing stages such as a luma motion compensation stage and a luma reconstruction stage before arriving at the chroma processing stage(s). This latency provides time for the required reference data to be prefetched from the memory. Also based on the results of mode decision, the chroma processing stage(s) may or may not perform certain processes for or operations on the chroma elements of the macroblock. For example, in at least some embodiments, intra-frame estimation for chroma is performed by the chroma processing stage(s) if and only if the best mode determined by mode decision based on luma processing is an intra-frame mode.

Embodiments of block processing methods and apparatus as described herein including the delayed chroma processing methods and apparatus are generally described in the context of video processing in which input frames are subdivided into and processed according to blocks of picture elements (referred to as pixels, or pels), specifically 16×16 pixel blocks referred to as macroblocks that are used, for example, in H.264 encoding. However, these methods may be used in encoders for other video encoding formats, for example in HEVC (High Efficiency Video Encoding) encoders, and may be used for other block formats, for example Coding Tree Units (CTUs) used in HEVC that may vary within the range of 16×16 pixels to 64×64 pixels.

Figure 4A:
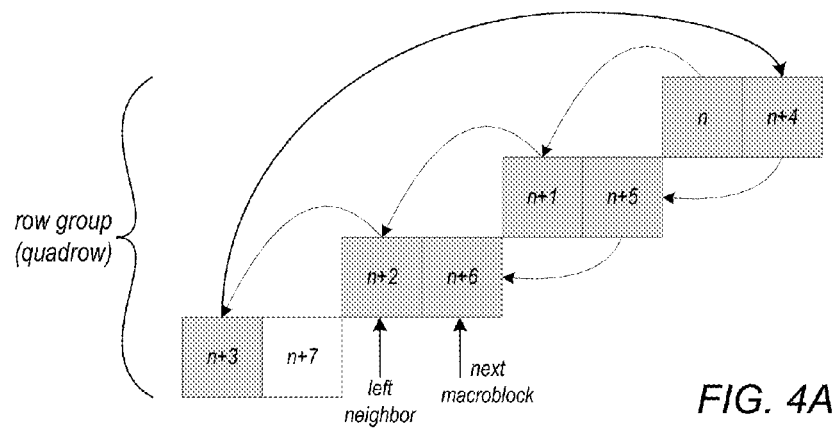
FIG. 4A shows a portion of a row group as processed in a pipeline according to a knight's order processing method.
Figure 4B:
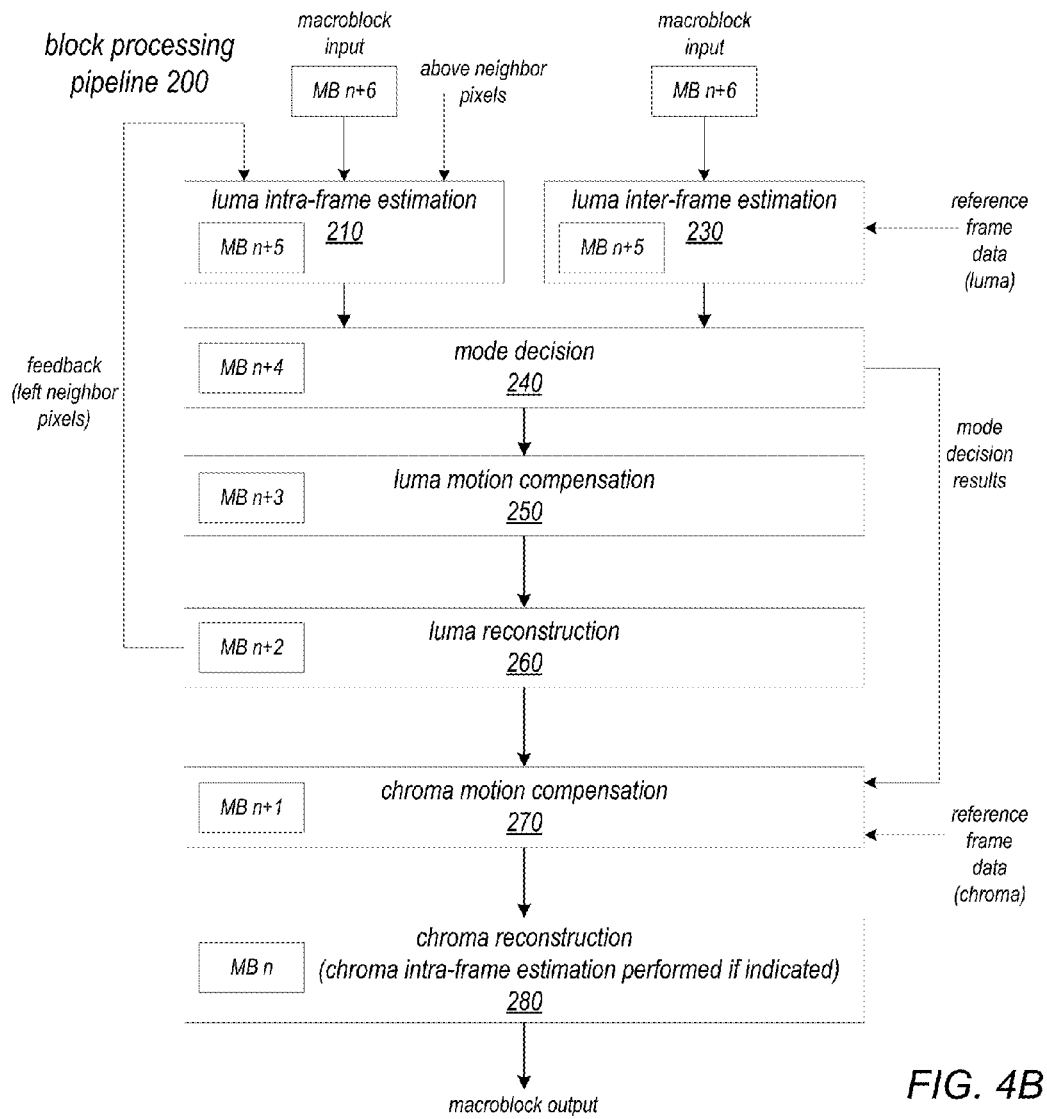
FIG. 4B graphically illustrates an example block processing pipeline 200 in which the example macroblocks of FIG. 4A are currently being processed, according to at least some embodiments.

FIGS. 4A and 4B graphically illustrate processing macroblocks in a block processing pipeline in which an input method such as knight's order is used that provides spacing between macroblocks in the pipeline. The spacing provided by the input method, for example, allows reconstructed pixels from a neighbor block to be fed back to an earlier stage for use in processing a current block, and also allows chroma processing to be delayed by one or more stages which provides latency for prefetching reference data for use in performing chroma motion compensation and reconstruction.

FIG. 4A shows a portion of a row group (in this example, a quadrow) as processed in a pipeline according to a knight's order processing method. Each square represents a macroblock (MB) on the current quadrow. In this example, inputting the macroblocks in knight's order, MB n is the first macroblock input, followed in order by MB n+1, MB n+2, MB n+3, MB n+4, and MB n+5. The next macroblock that is input will be MB n+6. Note that MB n is the left neighbor of MB n+4, MB n+1 is the left neighbor of MB n+5, and MB n+2 is the left neighbor of MB n+6. Thus, each macroblock is separated by four stages in the pipeline from its left neighbor. More generally, each macroblock is separated by r stages in the pipeline from its left neighbor, where r is the number of rows in the row group.

FIG. 4B graphically illustrates an example block processing pipeline 200 in which the example macroblocks of FIG. 4A are currently being processed, according to at least some embodiments. In FIG. 4B, luma intra-frame estimation 210 and luma inter-frame estimation 230 may be performed at one or more stages at or near the beginning of the pipeline. Mode decision 240, luma motion compensation 250, luma reconstruction 260, chroma motion compensation 270, and chroma reconstruction 280 may each be implemented at or as separate stages. As shown in FIG. 4B, macroblock (MB) n is currently being processed at the chroma reconstruction 280 stage, MB n+1 is currently being processed at the chroma motion compensation 270 stage, MB n+2, is currently being processed at the luma reconstruction 260 stage, MB n+3 is currently being processed at the luma motion compensation 250 stage, MB n+4 is currently being processed at the mode decision 240 stage, and MB n+5 is being processed at both luma intra-frame estimation 210 and luma inter-frame estimation 230. The next macroblock to be input to the pipeline is MB n+6.

MB n+2 is the left neighbor of MB n+6, so reconstructed pixels from MB n+2 are fed back from the luma reconstruction 260 stage to the luma intra-frame estimation 210 stage to be used in performing luma intra-frame estimation on MB n+6. In at least some embodiments, neighbor pixels from one or more above neighbor macroblocks (macroblocks on the row above the current macroblock) may also be used in performing luma intra-frame estimation on a current macroblock at the stage. The section titled Caching neighbor data describes example methods and apparatus via which above neighbor data may be provided to the luma intra-frame estimation 210 stage. In at least some embodiments, luma data from one or more previously processed reference frames may be fetched into a local memory to be used in performing luma inter-frame estimation 230 on macroblocks at the stage.

Luma intra-frame estimation 210 and luma inter-frame estimation 230 each provide results to mode decision 240, which determines a best mode for reconstructing luma according to the results received from the upstream stages. Mode decision 240 results (e.g., the determined best mode) are passed to the next stage (luma motion compensation 250) and are also passed forward three stages to the chroma motion compensation 270 stage. Passing results of mode decision 240 forward to chroma motion compensation 270 provides latency (e.g., three pipeline cycles) for prefetching chroma reference data from memory for a given macroblock. For example, in FIG. 4B, MB n+4 is at the mode decision 240 stage. Passing mode decision results for MB n+4 forward to chroma motion compensation 270 allows chroma motion compensation 270 to prefetch chroma reference data for MB n+4 while MB n+4 is being processed at luma motion compensation 250 and luma reconstruction 260.

In at least some embodiments, after a macroblock is processed at mode decision 240, luma motion compensation 250 is performed at a next stage, followed by luma reconstruction 260 at the stage after that. Chroma motion compensation 270 and chroma reconstruction 280 are not performed on a macroblock until after luma motion compensation 250 and luma reconstruction 260.

In at least some embodiments, chroma motion compensation 250 may generate a prediction block including subpixel interpolation for Cb and Cr chroma blocks; the size is based on the partition size and chroma formats. A full size chroma block is 8×8, 8×16, or 16×16 pixels for chroma formats 4:2:0, 4:2:2 and 4:4:4, respectively, with each chroma pixel including a Cb (blue-difference) and a Cr (red-difference) chroma component. In at least some embodiments, chroma motion compensation 250 may prefetch and cache chroma prediction pixels (reference data) from a memory. In at least some embodiments, the chroma reference data may be prefetched based on mode decision 240 results. Chroma motion compensation 250 performs subpixel interpolation to generate a prediction block. Mode decision 240 provides the macroblock type and sub-types, reference frame index per partition, and corresponding motion vectors, all based on processing of luma data for the macroblock. The inter-frame prediction generated by chroma motion compensation 250 may be output to chroma reconstruction 280.

In at least some embodiments, chroma reconstruction 280 may perform chroma prediction, chroma intra estimation and chroma reconstruction for inter and intra modes. In at least some embodiments, at chroma reconstruction 280, if the best mode determined by mode decision 240 is an intra mode, then chroma intra estimation may be performed to determine a best chroma intra mode. Based on the best chroma intra mode, chroma intra prediction may be performed using one of four chroma intra modes. In at least some embodiments, for chroma formats 4:2:0 and 4:2:2, chroma intra estimation and prediction may be performed. For chroma format 4:4:4, chroma intra estimation is not performed; instead, the same prediction modes as determined by luma intra-frame estimation 210 may be used. In at least some embodiments, chroma intra estimation may be performed at this downstream stage rather than at luma intra-frame estimation 210 so that reconstructed pixels from luma reconstruction 250 can be fed back and used during the luma intra-estimation 210 process. Thus, chroma intra estimation and intra prediction may be delayed until after luma processing, and are only performed if the best mode determined by mode decision 240 based on luma intra- and inter-estimation results is an intra mode.

For inter-predicted macroblocks, chroma inter prediction pixels are received by chroma reconstruction 280 from chroma motion compensation 270. In at least some embodiments, for chroma format 4:4:4, the luma intra prediction mode(s) are used to generate the chroma block prediction, and chroma inter prediction is performed in the same manner as for luma. Therefore, chroma reconstruction may include 4:2:0 and 4:2:2 chroma reconstruction, with luma reconstruction used to reconstruct chroma in 4:4:4 chroma format.

Figure 5:
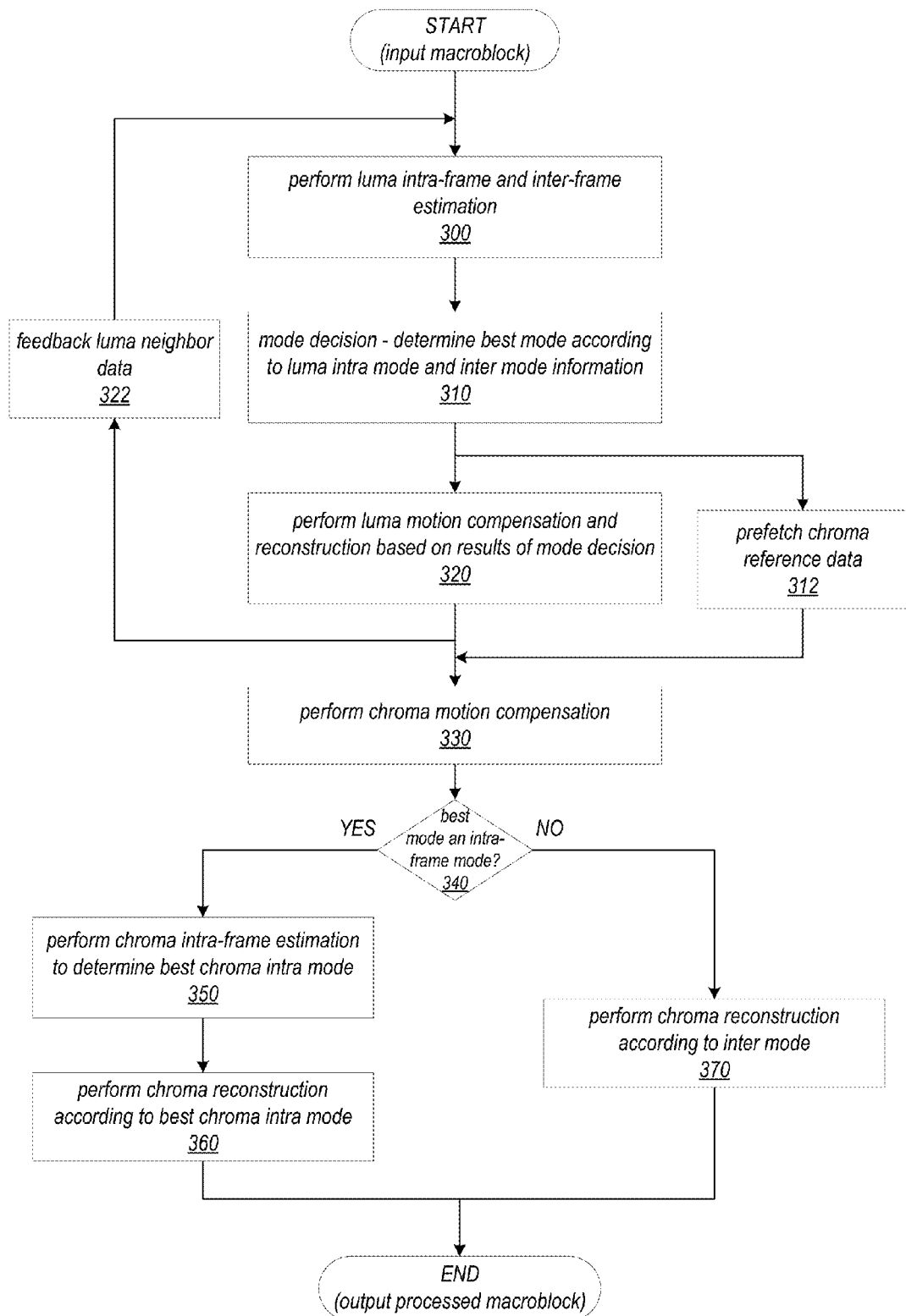
FIG. 5 is a flowchart of a macroblock processing pipeline method in which chroma processing is delayed until after luma processing, according to at least some embodiments.

FIG. 5 is a flowchart of a macroblock processing pipeline method in which chroma processing is delayed until after luma processing, according to at least some embodiments. This flowchart illustrates the processing of a single macroblock as it passes through a block processing pipeline, for example the pipeline 200 illustrated in FIG. 4B.

As indicated at 300 of FIG. 5, intra-frame and inter-frame estimation may be performed on luma elements of the current macroblock. Intra-frame and inter-frame estimation operations may determine blocks of previously encoded pixels to be used in encoding macroblocks input to the pipeline. For example, in H.264 video encoding, each macroblock can be encoded using blocks of pixels that are already encoded within the current frame. The process of determining these blocks may be referred to as intra-frame estimation, or simply intra-estimation. However, macroblocks may also be encoded using blocks of pixels from one or more previously encoded reference frames. The process of finding matching pixel blocks in reference frames may be referred to as inter-frame estimation, or motion estimation.

As indicated at 310, results of intra-frame and inter-frame estimation are passed to a mode decision stage, which determines a best mode according to the luma intra mode and luma inter mode information received from the upstream stage(s). As indicated at 320, luma motion compensation and reconstruction may be performed based on the results of mode decision. In addition, as indicated at 312, the mode decision stage may pass results information forward to a chroma motion compensation stage so that chroma reference data may be prefetched while the macroblock is being processed at the intervening luma motion compensation and reconstruction stages at 320. In at least some embodiments, as indicated at 322, results of processing the luma elements of the macroblock at the luma motion compensation and reconstruction stages may be fed back to the luma intra-frame estimation stage for use as left neighbor data of a subsequent macroblock.

As indicated at 330, chroma motion compensation may be performed on the macroblock subsequent to luma motion compensation and reconstruction 320 to generate a chroma inter-frame prediction, which may be output to a chroma reconstruction stage.

At 340, if the best mode determined by mode decision is an intra mode, then chroma intra-frame estimation may be performed to determine a best chroma intra mode, as indicated at 350. Chroma reconstruction may then be performed based on the best chroma intra mode, as indicated at 360. In at least some embodiments, for chroma formats 4:2:0 and 4:2:2, chroma intra estimation and prediction may be performed. For chroma format 4:4:4, chroma intra estimation is not performed; instead, the same prediction modes as determined by luma intra-frame estimation may be used. The processed macroblock may be output to a next stage.

At 340, if the best mode determined by mode decision is an inter mode, then chroma reconstruction may be performed according to an inter-frame mode, as indicated at 370. For inter-predicted macroblocks, chroma inter prediction pixels are received at the chroma reconstruction stage from the chroma motion compensation stage. In at least some embodiments, for chroma format 4:4:4, the luma intra prediction mode(s) are used to generate the chroma block prediction, and chroma inter prediction is performed in the same manner as for luma. The processed macroblock may be output to a next stage.

Knight's Order Processing

Embodiments of block processing methods and apparatus are described in which, rather than processing blocks in a pipeline according to scan order as in conventional methods, the blocks are input to and processed in the pipeline according to an order referred to herein as "knight's order." Knight's order is in reference to a move of a chess knight piece in which the knight moves one row down and two columns to the left. Note, however, that "knight's order" as used herein more generally encompasses movements of one row down and p columns to the left, where p may be but is not necessarily 2.

Figure 6:
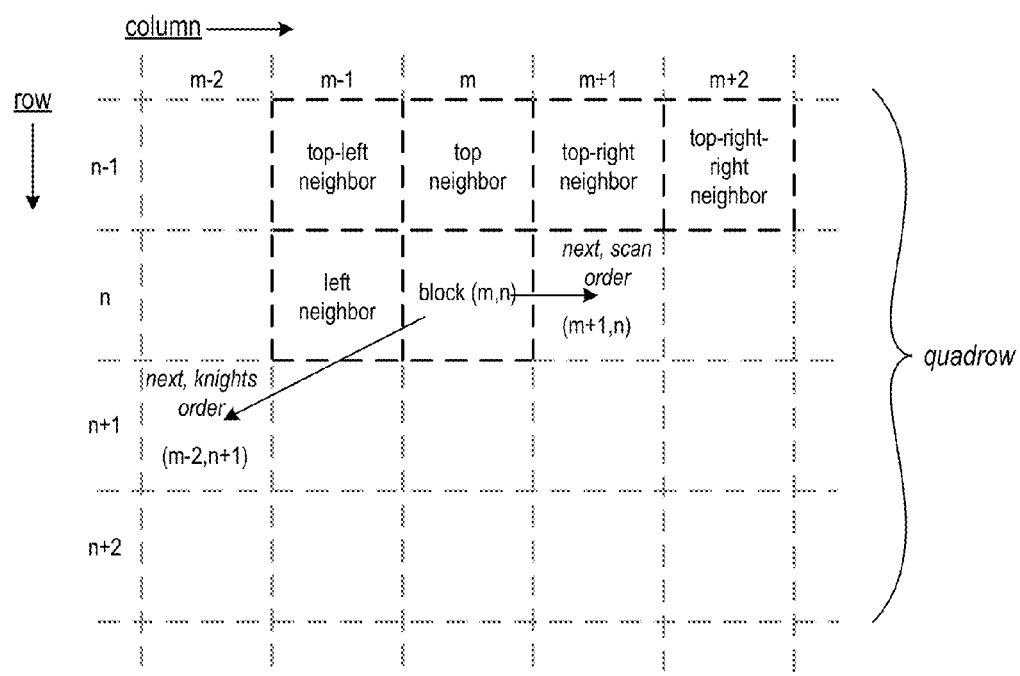
FIG. 6 shows neighbor blocks of a current block in a frame, and further illustrates a knight's order processing method for the blocks, according to at least some embodiments.

The knight's order processing method may provide spacing (one or more stages) between adjacent blocks in the pipeline, which, for example, facilitates feedback of data from a downstream stage of the pipeline processing a first block to an upstream stage of the pipeline processing a second block that depends on the data from the first block. One or more stages of a block processing pipeline may require information from one or more other neighbor blocks when processing a given block. FIG. 6 shows neighbors of a current block (m,n) from which information may be required—left (m−1,n); top (m,n−1); top-left (m−1,n−1); top-right (m+1,n−1); and top-right-right (m+2,n−1). These requirements for information from neighbor block(s) may be referred to as dependencies. For example, referring to FIG. 6, information from the left neighbor of block (m,n) may be required to perform a particular operation on the block. In the knight's order processing method, rather than inputting block (m+1, n) into the pipeline immediately after block (m,n), the next block input to the pipeline is block (m−2, n+1). Inputting the blocks into the pipeline in knight's order rather than scan order provides spacing (e.g., one or more stages) between adjacent blocks on a row in the pipeline.

In at least some embodiments of the knight's order processing method, the rows of blocks in the input frame may be divided into sets of four rows, referred to herein as quadrows, with the knight's order processing method constrained by the quadrow boundaries. Referring to FIG. 6, when using quadrow boundaries with knight's order processing block (m−1,n) will be four stages downstream when block (m,n) is input to the pipeline, and block (m,n) will be four stages downstream when block (m+1,n) is input to the pipeline. Thus, blocks that are adjacent on a row will be spaced four stages apart in the pipeline. Thus, at stages in which operations are performed on a block that depend on left neighbor information, the information for the left neighbor is more likely to be readily available with less latency than it would be if processing the blocks in scan order. In addition to dependencies on the left neighbor, one or more operations of a block processing method may depend on neighbor blocks from the previous (or above) row such as the top neighbor, top-left neighbor, top-right neighbor, and top-right-right neighbor blocks as shown in FIG. 6. The knight's order processing method with quadrow constraints provides locality of neighbor information that may be leveraged to provide local caching of this neighbor data at each stage in relatively small buffers.

In at least some embodiments, a basic algorithm for determining a next block to input to the pipeline according to the knight's order processing method using quadrow constraints is as follows:

If not on the bottom row of a quadrow:
The next block is two columns left, one row down (−2,+1).
Otherwise, at the bottom row of a quadrow:
The next block is seven columns right, three rows up (+7,−3).

However, the knight's order processing method may also be implemented with other spacing than two blocks left, one block down (−2,+1). For example, instead of two blocks left and one block down, the method may be implemented to go three blocks left and one block down to get the next block. As another example, the method may be implemented to go one block left and one block down (−1,+1) to get the next block. In addition, the knight's order processing method may be implemented with other row constraints than quadrow (four row) constraints. In other words, row groups of at least two rows may be used in embodiments to constrain the knight's order processing method. Assuming r as the number of rows used to constrain the knight's order processing method, the algorithm may be generalized as:

If not on the bottom row of a row group:
The next block is p columns left, one row down (−p,+1).
Otherwise, at the bottom row of a row group:
The next block is q columns right, (r−1) rows up (+q,−(r−1)).

Changing the value of p would affect the value of q, would not affect spacing between adjacent blocks from a row in the pipeline, but would affect spacing between a given block and its other neighbor blocks (e.g., its top-left, top, and top-right neighbors). In particular, note that using the spacing (−1,+1) would result in a block and its diagonal (top-right) neighbor block being concurrently processed at adjacent stages of the pipeline. Thus, a spacing of at least two blocks left may be used so that diagonally adjacent blocks are not concurrently processed at adjacent stages of the block processing pipeline. Changing the value of r would affect the value of q, would affect spacing between adjacent blocks from a row in the pipeline, and would affect spacing between the block and its other neighbor blocks (e.g., its top-left, top, and top-right neighbors).

The above algorithm for determining a next block may begin at an initial block. Upon reaching the end of a quadrow that is followed by another quadrow, the algorithm jumps to the first block of the next quadrow and then crosses over between the quadrow and the next quadrow for a few cycles, resulting in the interleaving of some blocks from the end of the quadrow with some blocks from the beginning of the next quadrow. In other words, the knight's order processing method treats the quadrows as if they were arranged end to end. To avoid complications in the algorithm and to maintain consistent spacing of blocks in the pipeline, at least some embodiments may pad the beginning of the first quadrow and the end of the last quadrow with invalid blocks. An invalid block may be defined as a block that is outside the boundary of the frame and that is input to the pipeline but that does not contain valid frame data, and thus is not processed at the stages. The algorithm for determining a next block may thus begin at an initial block, which may be either the first block in the top row of the first quadrow or an invalid block to the left of the first block in the top row of the first quadrow, proceed through all of the quadrows, and at the end of the last quadrow continue until the last block of the last quadrow has been input to the pipeline. There will be bubbles in the pipeline at the beginning and end of the frame, but the spacing of the valid blocks from the frame in the pipeline will remain consistent throughout. In some embodiments, as an alternative to padding the end of the last quadrow of a video frame with invalid blocks, the last quadrow of a video frame may be overlapped with the first row of the next video frame to be processed in the block processing pipeline.

Figure 7A:
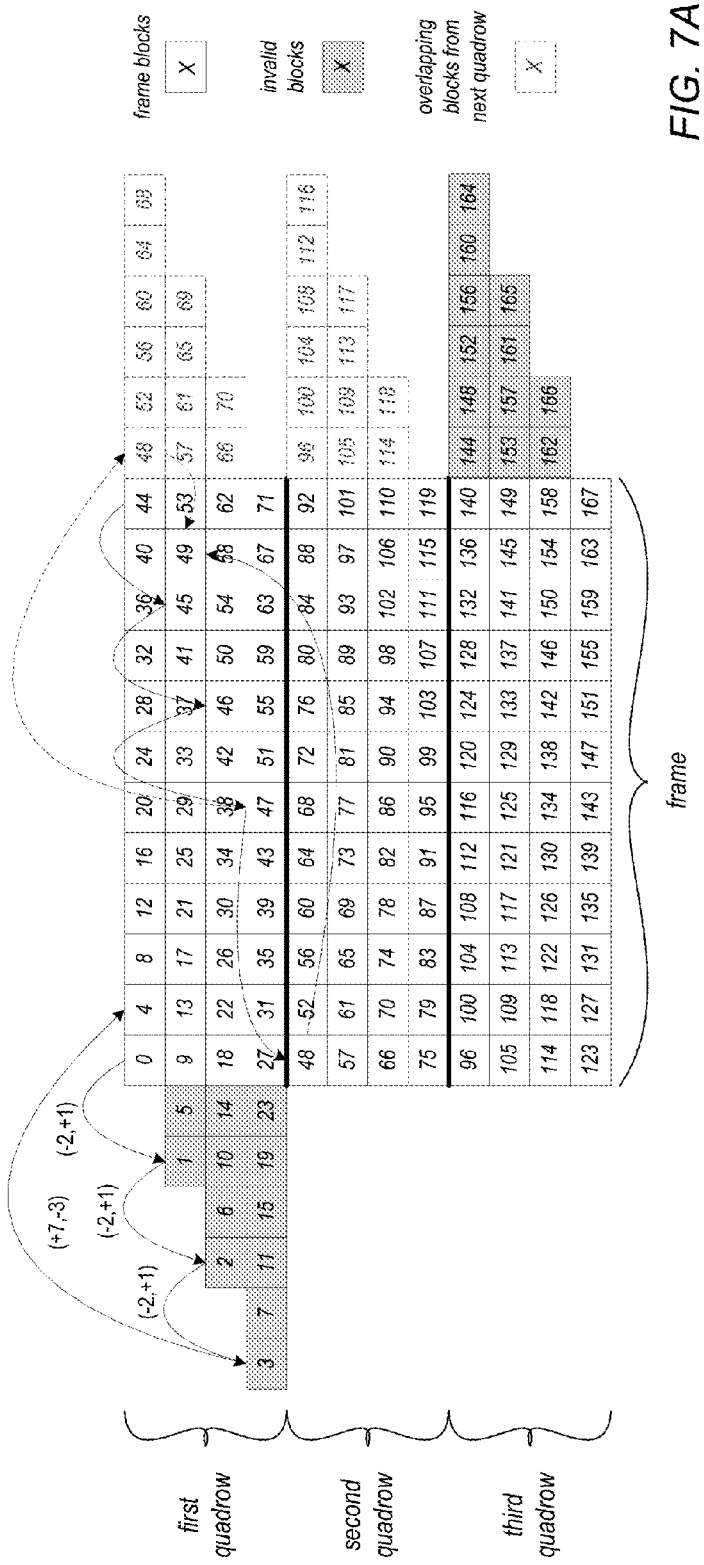
FIGS. 7A and 7B graphically illustrate the knight's order processing method including the algorithm for determining a next block, according to at least some embodiments.
Figure 7B:
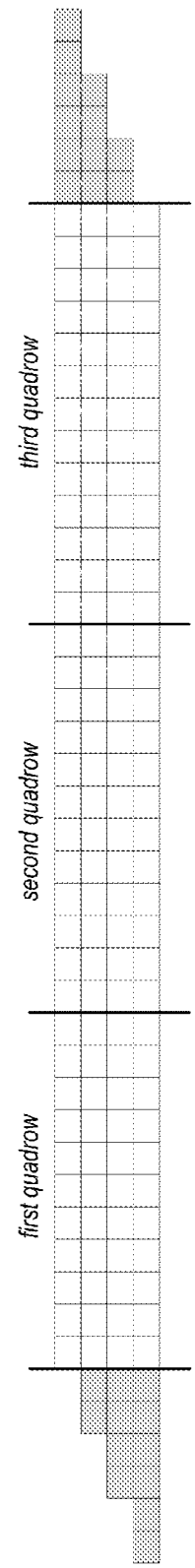

FIGS. 7A and 7B graphically illustrate the knight's order processing method, according to at least some embodiments. For simplicity, these Figures use an example 192×192 pixel frame divided into 144 16×16 pixel blocks, with 12 rows and 12 columns of blocks. However, it is to be noted that the knight's order processing method can be applied to input video frames of any dimensions. In FIG. 7A, an example frame is divided into rows and columns of blocks. The rows of blocks are partitioned into three quadrows including four rows each. The last three rows of the first quadrow are padded on the left with invalid blocks, and the first three rows of the last (third) quadrow are padded on the right with invalid blocks. In this example, the numbers in the blocks represent the order in which the blocks are input to the block processing pipeline according to the knight's order processing method, beginning with block 0 (the first block in the top row of the first quadrow). Block 0 is input to the first stage of the pipeline, and when the first stage is ready for another block, the method proceeds by going two columns left, one row down to get the next block for input (block 1, in FIG. 7A). This pattern is repeated until reaching the bottom of the quadrow. At the bottom of the quadrow, the method goes seven columns right, three rows up to get the next block. This continues until all of the blocks in the frame (as well as all of the invalid blocks shown in FIG. 7A) are input into the pipeline. When the end of a quadrow is reached, if there is another quadrow after the quadrow the input algorithm proceeds to the beginning of the next quadrow. In this example, after block 47 is input, the method proceeds to block 48 (the first block in the top row of the second quadrow). As shown by the dashed arrow from block 47 to the dashed rectangle labeled 48 to the right of block 44, the first block of the top row of the second quadrow (block 48) is treated as being immediately to the right of the last block of the top row of the first quadrow (block 44), and thus is reached from block 47 by going seven columns right, three columns up. In other words, the knight's order processing method treats the quadrows as if they were arranged end to end, with invalid blocks at each end, as shown in FIG. 7B. Thus, the algorithm for determining a next block remains the same across the entire frame.

In some embodiments, each row of the first quadrow may be padded with extra invalid blocks, for example with two extra invalid blocks. Instead of beginning with the first block in the top row of the first quadrow as shown in FIG. 7A, input to the pipeline may begin with the first invalid block to the left of the first block in top row of the first quadrow.

Figure 8A:
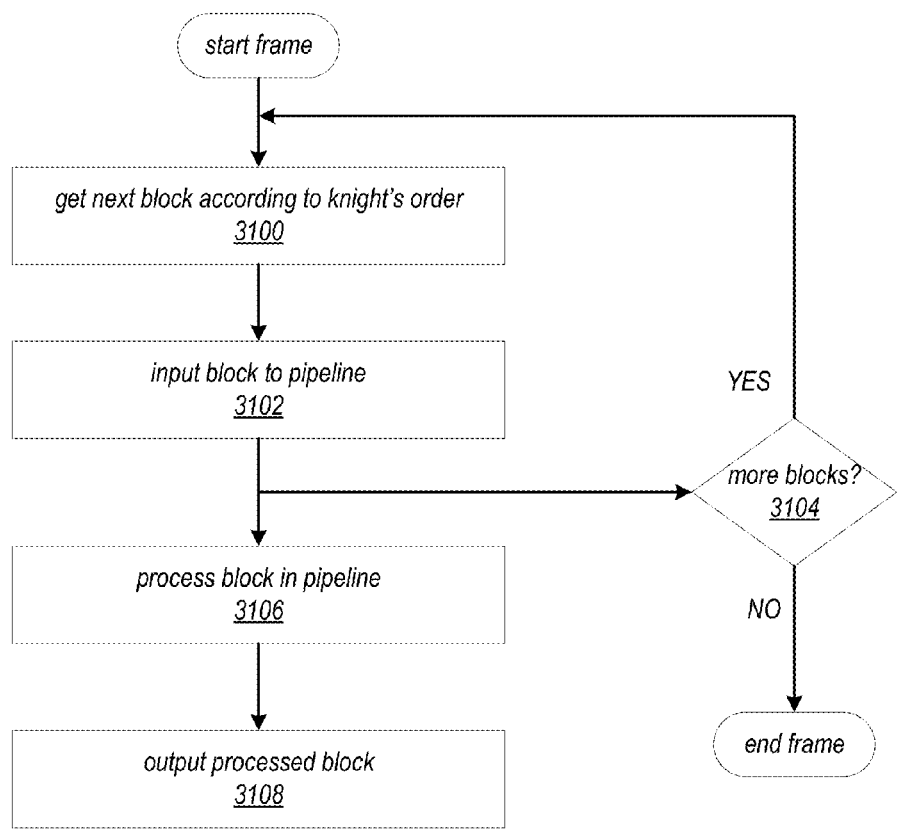
FIGS. 8A and 8B are high-level flowcharts of a knight's order processing method for a block processing pipeline, according to at least some embodiments.
Figure 8B:
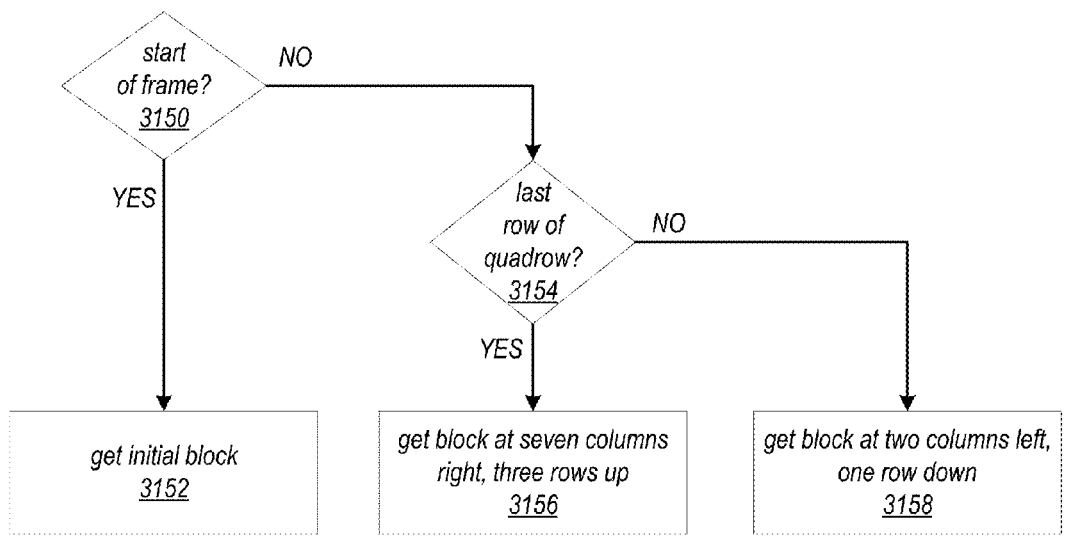

FIGS. 8A and 8B are high-level flowcharts of a knight's order processing method for a block processing pipeline, according to at least some embodiments. In FIG. 8A, as indicated at 3100, a next block is determined according to the algorithm for determining a next input block that is implemented by the knight's order processing method. As indicated at 3102, the block is input to the pipeline, for example from a memory via direct memory access (DMA). As shown by 3104, the input process of elements 3100 and 3102 continues as long as there are blocks to be processed. Each block that is input to the pipeline by elements 3100 and 3102 is processed in the pipeline, as indicated at 3106. Each block is initially input to a first stage of the pipeline, processed, output to a second stage, processed, and so on. When a block moves from a stage to a next stage of the pipeline, the stage can begin processing the next block in the pipeline. Thus, the input blocks move through the stages of the pipeline, with each stage processing one block at a time. As indicated at 3108, once a block has been processed by a last stage of the pipeline, the processed block is output, for example to a memory via direct memory access (DMA).

FIG. 8B is a flowchart of an example algorithm for determining a next input block that that may be implemented by the knight's order processing method, and expands on element 3100 of FIG. 8A. FIG. 8B assumes that the frame is divided into quadrows, and that the algorithm used to determine the next frame is two columns left, one row down (−2,+1) if not on the bottom row of a quadrow, seven columns right, three rows up (+7,−3) if on the bottom row. However, other row groupings and/or spacing algorithms may be used. At 3150, if at the start of the frame, the method gets an initial block as indicated at 3152. If this is not the start of the frame, then at 3154, if this is the last row of the quadrow, the next block is seven columns right, three rows up, as indicated at 3156. If this is not the last row of the quadrow, the next block is two columns left, one row down, as indicated at 3158.

Caching Neighbor Data

One or more operations performed at stages of a block processing pipeline may depend on one or more of the neighbor blocks from the previous (or above) row of blocks such as the top neighbor, top-left neighbor, top-right neighbor, and top-right-right neighbor blocks, as well as on the left neighbor, as shown in FIG. 6. The knight's order processing method with quadrow constraints provides locality of neighbor information that may be leveraged to provide local caching of neighbor data at each stage of the pipeline in relatively small local buffers. In at least some embodiments, the local buffers may be implemented using SRAM (static random access memory) technology. However, the local buffers may be implemented using other memory technologies in some embodiments.

Note that blocks in the first column of a frame do not have a left or top-left neighbor, blocks in the last column do not have a top-right or top-right-right neighbor, and blocks in the next-to-last column do not have a top-right-right neighbor. Thus, for block processing methods that use information from these neighbor positions, the information in the local buffers for these neighbor positions relative to blocks in those columns is not valid and is not used in processing the blocks in those columns in the stages of the pipeline. In addition, there are no rows above the top row of the first quadrow, so the blocks in this row do not have top, top-left, top-right, and top-right-right neighbors.

In at least some embodiments of a block processing pipeline that implements the knight's order processing method, a first buffer of sufficient size to cache the C most recently processed blocks on the current quadrow may be implemented at each of one or more stages of the pipeline. This buffer may be referred to as the current quadrow buffer, and may, for example, be implemented as a circular FIFO buffer. In at least some embodiments, C may be determined such that the buffer includes an entry corresponding to the top-left neighbor of the current block at the stage according to the algorithm for determining a next block and the row group size used to constrain the knight's order method. The buffer may also include entries corresponding the top-right-right, left, top-right, and top neighbors for the current block according to the algorithm. When processing a block, a stage may access the current quadrow buffer to obtain neighbor information for the block if that block's neighbor information is valid in the current quadrow buffer. Note that some block processing methods may not require top-left neighbor information, and the current quadrow buffer may be smaller in these implementations.

When a stage completes processing of a block, the block's information is written to the last position in the current quadrow buffer, overwriting the entry at the position of the block's top-left neighbor, thus preparing the buffer for the next block to be processed at the stage. Note that, initially, at the beginning of a frame, there is no information in the current quadrow buffer as no blocks in the frame have been processed, so no block information will be overwritten in the buffer until the buffer is filled. When the next block is at the stage, the previous block's information in the buffer is the block's top-right-right neighbor information.

Figure 9:
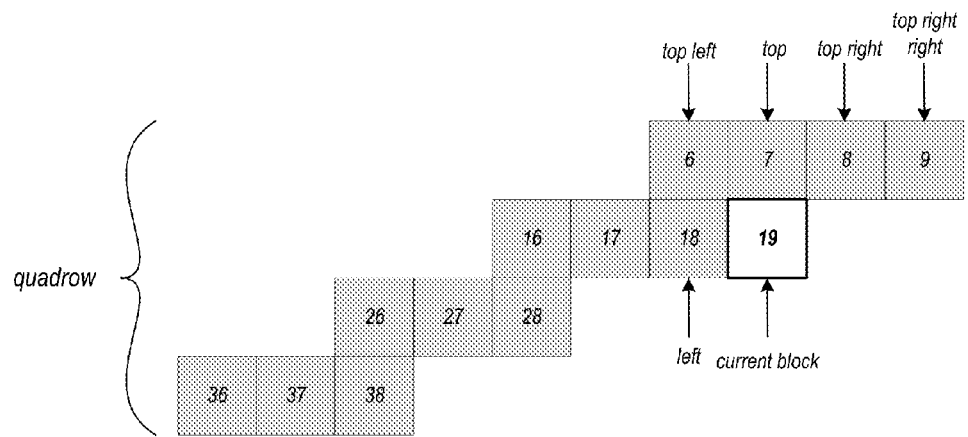
FIG. 9 shows a portion of a quadrow as processed in a pipeline according to the knight's order processing method that may be cached in the current quadrow buffer, according to at least some embodiments FIG. 10 graphically illustrates blocks in a current quadrow being processed according to the knight's order processing method, as well as neighbor blocks in the last row of the previous quadrow that may be cached in a previous quadrow buffer, according to at least some embodiments.

For example, using quadrow boundaries and the algorithm for determining a next block where the next block is two columns left, one row down if not on the bottom row of a quadrow, C=13 would be sufficient to include the top-left neighbor of the current block, as the spacing between the current block and its top-left neighbor is 13. FIG. 9 shows a portion of a quadrow as processed in a pipeline according to the knight's order processing method that may be cached in the current quadrow buffer, according to at least some embodiments. Block 19 represents a current block at a stage. The shaded blocks represent the 13 most recently processed blocks by the stage. Note that the farthest block from block 19 in time is its top-left neighbor (block 6), and the nearest block in time is its top-right-right neighbor (block 9).

For the blocks in the top row of a quadrow, information for neighbors in the row above is not in the current quadrow buffer. There are no rows above the top row of the first quadrow, and for all other quadrows the row above the top row is the bottom row of the previous quadrow. Thus, the current quadrow buffer includes the left neighbor information for all blocks in the top row of a quadrow (except for the first block, which has no left neighbor), but does not include the top-left, top, top-right, and top-right-right neighbor information for the blocks in the top row of the quadrow. To provide this neighbor information for blocks on the top rows of the quadrows, a second buffer of sufficient size to hold information for the required neighbor blocks from the last row of the previous quadrow may be implemented at one or more stages of the pipeline. This buffer may be referred to as the previous quadrow buffer, and may, for example, be implemented as a circular FIFO buffer. The number of entries in the previous quadrow buffer, as well as the particular neighbor blocks that are cached in the previous quadrow buffer, may be dependent on the requirements of the particular block processing method that is implemented by the block processing pipeline. In at least some embodiments, when processing a quadrow according to the knight's order processing method, information for each block on the bottom row of the quadrow may be written to an external memory, for example when the block is at a last stage of the pipeline. For each block in the top row of a quadrow, neighbor (e.g., top-right-right neighbor) data may be read from the external memory, for example at a first stage of the pipeline. This neighbor information may be passed down the pipeline to the other stages along with the corresponding block from the top row.

Figure 10:
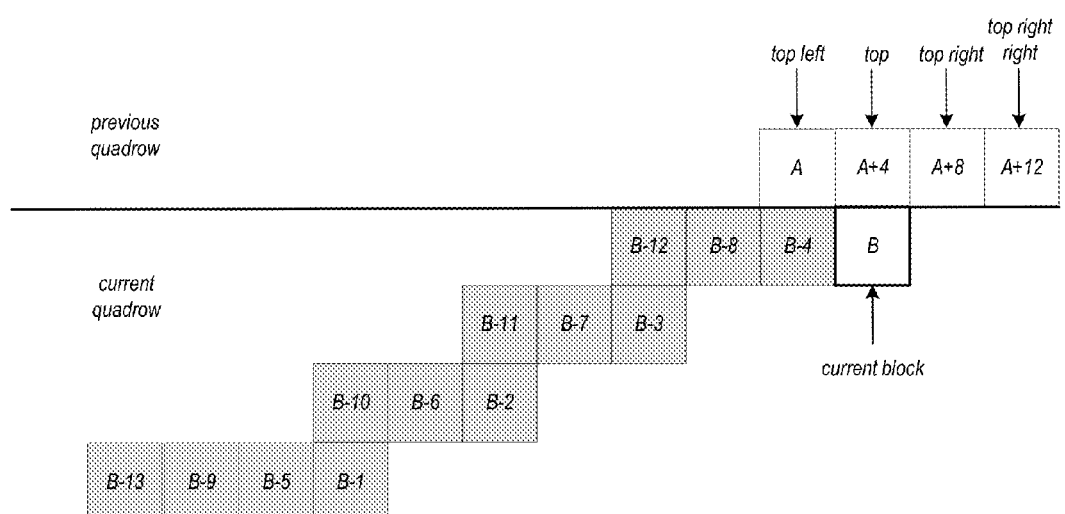

FIG. 10 graphically illustrates blocks in a current quadrow being processed according to the knight's order processing method, as well as neighbor blocks in the last row of the previous quadrow, according to at least some embodiments. Blocks A, A+4, A+8, and A+12 were processed on the previous quadrow according to the knight's order processing method. Block A was processed first, block A+4 was processed four cycles later, and so on. Block B represents a block on the current quadrow that is currently at a particular stage of the pipeline. Blocks B−1 (B minus 1) through B−13 (B minus 13) represent the thirteen blocks that were most recently processed at the stage in the current quadrow. Information from these blocks may be presently cached in the stage's current quadrow buffer, with B−1 as the most recent entry and B−13 as the oldest entry. B−4 is current block B's left neighbor. However, block B's top-left (block A), top (block A+4), top-right (block A+8), and top-right-right (block A+12) neighbors are on the bottom row of the previous quadrow, and are not included in the current quadrow buffer for block B. In at least some embodiments, to provide neighbor information for blocks on the top row of the current quadrow (e.g., top-left, top, top-right, and top-right-right neighbor information), a previous quadrow buffer may be implemented at each of one or more stages of the pipeline. When processing a quadrow, information for each block on the bottom row of the quadrow is written to a neighbor data structure in external memory, for example by a last stage of the pipeline. When processing blocks from the top row of a next quadrow, information for neighbor blocks in the bottom row of the previous quadrow is read from the external memory, for example by a first stage of the pipeline, and passed down the pipeline to other stages with the top row blocks. In at least some embodiments, information for the top-right-right neighbor block of a block in the top row is read from the external memory. In at least some embodiments, the previous quadrow buffer is a circular buffer, and an oldest entry in the previous quadrow buffer is replaced with the neighbor information that is read from the external memory. In various embodiments, the external memory to which blocks in the bottom row are written and from which neighbor block information is read may be a memory of the pipeline component that is external to the last stage, a memory of a video encoder that implements the pipeline, or a memory external to the video encoder. In some embodiments, however, the memory may be a local memory of the last stage of the pipeline. At least some embodiments may include an interlock mechanism to control the reads and writes to the external memory between rows to avoid overwriting the data in external memory.

Figure 11:
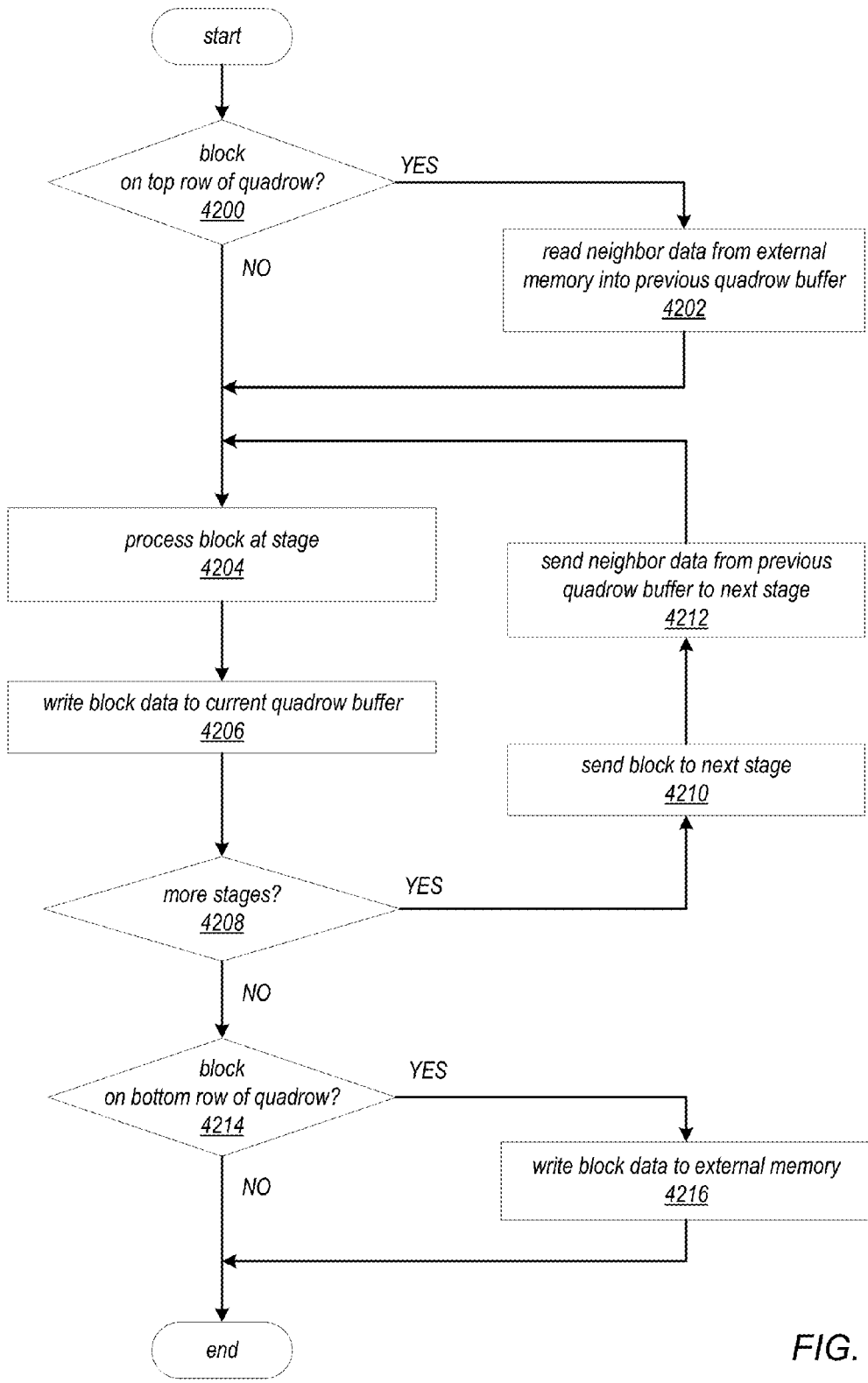
FIG. 11 is a flowchart of a method for processing blocks in a block processing pipeline in which neighbor data is cached in local buffers at the stages of the pipeline, according to at least some embodiments.

FIG. 11 is a flowchart of a method for processing blocks in a block processing pipeline in which neighbor data is cached in local buffers at the stages of the pipeline, according to at least some embodiments. For example, the method of FIG. 11 may be used at element 3106 of FIG. 8A to process blocks input to the pipeline according to the knight's order processing method as shown at elements 3100, 3102, and 3104 of FIG. 8A. In FIG. 11, a block is input to the pipeline. At 4200, at a first stage of the pipeline, if the block is on the top row of a quadrow, then neighbor data for the block may be read from external memory (for example, via DMA) into a previous quadrow buffer as indicated at 4202. In at least some embodiments, the neighbor data corresponds to the top-right-right neighbor of the current block on the bottom row of the previous quadrow. As indicated at 4204, the block is then processed at the current stage. If an operation at the stage requires neighbor information to process the block, the stage may use the neighbor information in the current quadrow buffer and/or in the previous quadrow buffer to perform the operation. If the block is on the top row of a quadrow, then at least some of the neighbor information is obtained from the previous quadrow buffer; otherwise, neighbor information may be obtained from the current quadrow buffer. As indicated at 4206, information about the current block may be written to the current quadrow buffer at the stage for use on subsequent blocks. The information may overwrite an oldest entry in the current quadrow buffer.

At 4208, if there are more stages, then the block may be sent to a next stage, as indicated at 4210. At 4212, neighbor information from the previous quadrow buffer may also be sent to the next stage. In at least some embodiments, this neighbor information is only sent to the next stage if the current block is on the top row of a quadrow. Elements 4204 through 4212 may be repeated until the block reaches and is processed by a last stage of the pipeline. At 4208, if there are no more stages, then processing of the block in the pipeline is done. At 4214, if the block is on the bottom row of a quadrow, then information for the block is written to an external memory (for example, via DMA) to be read as neighbor data for blocks in the top row of a next quadrow. In addition, all of the processed valid blocks are output as shown by element 3108 of FIG. 8A.

Example Pipeline Units

Figure 12A:
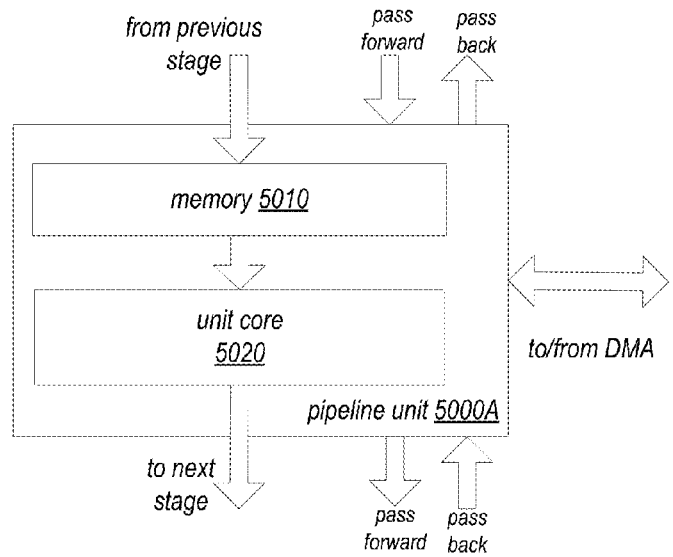
FIGS. 12A and 12B are block diagrams of example pipeline processing units that may be used at the stages of a block processing pipeline that implements one or more of the block processing methods and apparatus as described herein, according to at least some embodiments.
Figure 12B:
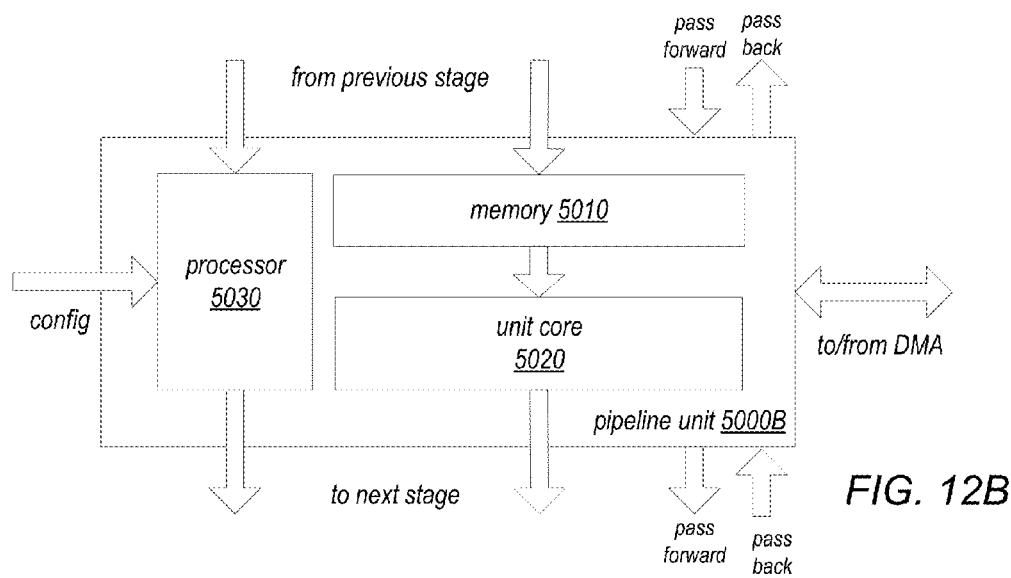
Figure 12C:
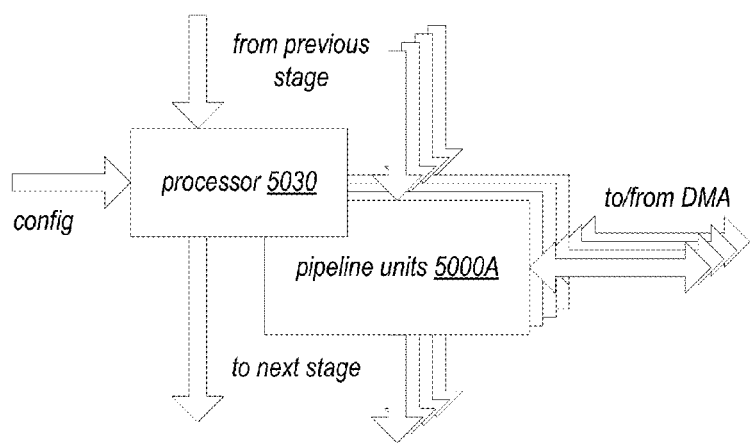
FIG. 12C shows that a single processor may be associated with a group of two or more pipeline units.

FIGS. 12A through 12C are block diagrams of example pipeline processing units that may be used at the stages of a block processing pipeline that implements one or more of the block processing methods and apparatus as described herein, according to at least some embodiments. For example, one or more of pipeline units 5000A and/or 5000B as shown in FIGS. 12A and 12B may be used at each stage of the example block processing pipeline shown in FIG. 13. Note that FIGS. 12A through 12C are not intended to be limiting; a pipeline processing unit may include more or fewer components and features than those shown in the Figures.

As shown in FIG. 12A, a pipeline unit 5000A may include at least a memory 5010 and a unit core 5020. Unit core 5020 may be a component (e.g., a circuit) that is configured to perform a particular operation on or for a block, or a portion of a block, at a particular stage of the block processing pipeline. Memory 5010 may, for example, be a double-buffered memory that allows the unit core 5020 to read and process data for a block from the memory 5010 while data for a next block is being written to the memory 5010 from a previous pipeline unit.

As shown in FIG. 12B, a pipeline unit 5000B, in addition to a memory 5010 and unit core 5020 as shown in FIG. 12A, may also include a processor 5030. Processor 5030 may, for example, be a mobile or M-class processor. The processors 5030 in pipeline units 5000B of a block processing pipeline may, for example, be used to control the block processing pipeline at block boundaries. The processors 5030 in pipeline units 5000B may be configurable, for example with low-level firmware microcode, to allow flexibility in algorithms that are implemented by the block processing pipeline for various applications. In at least some embodiments, a processor 5030 of a pipeline unit 5000B in the pipeline may be configured to receive data from a processor 5030 of a previous (upstream) pipeline unit 5000B and send data to a processor 5030 of a subsequent (downstream) pipeline unit 5000B. In addition, a processor 5030 of a pipeline unit 5000B at a last stage of the pipeline may be configured to send feedback data to a processor 5030 of a pipeline unit 5000B at a first stage of the pipeline.

As shown in FIGS. 12A and 12B, a pipeline unit 5000A or 5000B may be configured to access external memory, for example according to direct memory access (DMA). In addition, a pipeline unit 5000A or 5000B may be configured to pass information back to one or more previous (upstream) stages of the pipeline and/or to receive information passed back from one or more subsequent (downstream) stages of the pipeline. In addition, a pipeline unit 5000A or 5000B may be configured to pass information forward to one or more subsequent (downstream) stages of the pipeline and/or to receive information passed forward from one or more previous (upstream) stages of the pipeline.

As shown in FIG. 12C, two or more units 5000A as shown in FIG. 12A may be grouped together and configured to perform an operation in the pipeline. A single processor 5030 may be used to control and/or configure the pipeline units 5000A.

Example Block Processing Pipeline

FIG. 13 is a high-level block diagram of general operations in an example block processing method 6000 for H.264 encoding that may be implemented in stages by a block processing pipeline that may implement one or more of the block processing methods and apparatus as described herein, according to at least some embodiments. A block processing pipeline that implements the block processing method 6000 may, for example, be implemented as a component of an H.264 video encoder apparatus that is configured to convert input video frames from an input format into H.264/Advanced Video Coding (AVC) format as described in the H.264/AVC standard. The H.264/AVC standard is published by ITU-T in a document titled "ITU-T Recommendation H.264: Advanced video coding for generic audiovisual services", which may be referred to as the H.264 Recommendation. An example input video format is 1080p (1920× 1080 pixels, 2.1 megapixels) encoded in YCbCr color space. However, other input video formats may be encoded into H.264 using embodiments of the pipeline in a video encoder apparatus.

Figure 15:
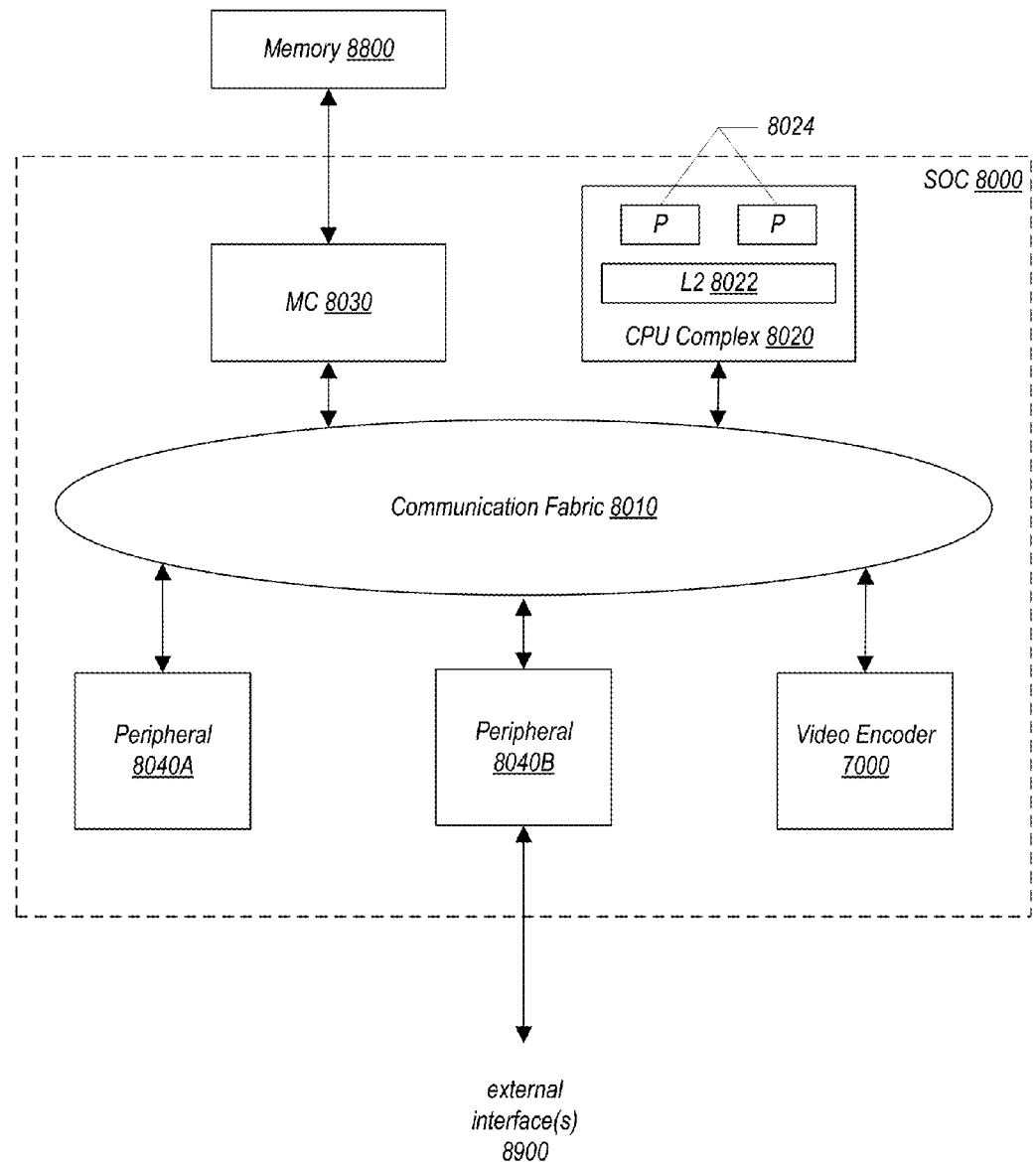
FIG. 15 is a block diagram of one embodiment of a system on a chip (SOC).

The video encoder apparatus may, for example, be implemented as an integrated circuit (IC) or as a subsystem on an IC such as a system-on-a-chip (SOC). In at least some embodiments, the video encoder apparatus may include at least a pipeline component, a processor component (e.g., a low-power multicore processor), and a bus subsystem or fabric that interconnects the functional components of the apparatus. The processor component of the video encoder apparatus may, for example, perform frame-level control of the pipeline such as rate control, perform pipeline configuration, and interface with application software via a driver. The pipeline component may implement multiple processing stages each configured to perform a portion or all of one or more of the operations as shown in FIG. 13, each stage including one or more processing units. At least one of the processing units in the pipeline may include a processor component (e.g., an M-class processor) that may, for example, configure parameters of the processing unit at the respective stage at the macroblock level. The video encoder apparatus may include other functional components or units such as memory components, as well as external interfaces to, for example, one or more video input sources and external memory. Example video input sources to the video encoder apparatus may include one or more of, but are not limited to, a video camera for raw video input processing, a decoder apparatus for re-encoding/transcoding, a flash or other memory, and a JPEG decoder. An example video encoder apparatus is illustrated in FIG. 14. An example SOC that includes a video encoder apparatus is illustrated in FIG. 15. While embodiments are generally described in relation to hardware implementations of a block processing pipeline that implements the block processing method 6000 with knight's order processing, note that the block processing method 6000 with knight's order processing may be implemented by a block processing pipeline implemented in software.

A pipeline that implements the method 6000 as shown in FIG. 13 may process 16×16 pixel macroblocks from input video frames according to the H.264 standard, each macroblock including two or more blocks or partitions that may be processed separately at stages of the pipeline. The input video frames may, for example, be encoded in YCbCr color space; each macroblock may be composed of separate blocks of chroma and luma elements that may be processed separately at the stages of the pipeline. A pipeline that implements the block processing method 6000 may receive input macroblocks from and output processed macroblocks to a memory. The memory may include memory of the video encoder apparatus and/or memory external to the video encoder apparatus. In at least some embodiments, the memory may be accessed by the pipeline as necessary, for example via direct memory access (DMA). In at least some embodiments, the memory may be implemented as a multi-level memory with a cache memory implemented between the pipeline and an external memory. For example, in some implementations, one or more quadrows may be read from an external memory and cached to the cache memory for access by the pipeline to reduce the number of reads to an external memory.

The general operations of the example H.264 video encoder method 6000 as shown in FIG. 13 that may be performed in stages by a pipeline, as well as general data flow through the pipeline, are briefly described below. Each of the general operations of the method 6000 may be implemented by one or more pipeline units at one or more stages of the pipeline. Example pipeline units are illustrated in FIGS. 12A through 12C. Also note that each general operation shown in FIG. 13 may be subdivided into two or more operations that may be implemented by pipeline units at one, two, or more stages of the pipeline. However, two or more of the operations shown in FIG. 13 may be performed at the same stage of the pipeline. Each stage in the pipeline processes one macroblock at a time, and thus two or more of the operations may simultaneously operate on the same macroblock that is currently at the respective stage. Note that a pipeline may perform more, fewer, or other operations than those shown in FIG. 13 and described below.

Macroblock Input

In at least some embodiments, macroblock input 6002 may be performed by an initial stage of the pipeline. In at least some embodiments, macroblock input 6002 receives luma and chroma pixels from a memory, for example via DMA, computes statistics on input pixels that are used by firmware in downstream stages of the pipeline, and buffers input macroblocks to enable firmware look ahead. The input macroblock pixel data and corresponding statistics are buffered and sent to one or more downstream stages of the pipeline that implement intra-frame and inter-frame estimation 6010 operations. In at least some embodiments, an input buffer of up to 16 macroblocks is maintained for input pixels and statistics. In at least some embodiments, the macroblock pixel data and corresponding statistics may be input to downstream stages of the pipeline according to a knight's order input algorithm as previously described in the section titled Knight's order processing.

In at least some embodiments, macroblock input 6002 reads neighbor data from the bottom row of a previous quadrow from memory at quadrow boundaries and passes the neighbor data to at least one downstream stage.

Intra-Frame and Inter-Frame Estimation

Intra-frame and inter-frame estimation 6010 operations may determine blocks of previously encoded pixels to be used in encoding macroblocks input to the pipeline. In H.264 video encoding, each macroblock can be encoded using blocks of pixels that are already encoded within the current frame. The process of determining these blocks may be referred to as intra-frame estimation, or simply intra-estimation. However, macroblocks may also be encoded using blocks of pixels from one or more previously encoded frames (referred to as reference frames). The process of finding matching pixel blocks in reference frames may be referred to as inter-frame estimation, or more generally as motion estimation. Intra-frame and inter-frame estimation 6010 operations may be subdivided into two or more sub-operations that may be performed at one, two, or more stages of the pipeline, with one or more components or pipeline units at each stage configured to perform a particular sub-operation.

In at least some embodiments, macroblock input 6002 reads neighbor data from the bottom row of a previous quadrow from memory at quadrow boundaries and passes the neighbor data to intra-frame and inter-frame estimation 6010, for example to an intra-frame estimation component. In addition, motion compensation and reconstruction 6030, for example a luma reconstruction component, may pass neighbor data as feedback to intra-frame and inter-frame estimation 6010, for example to the intra-frame estimation component.

Motion Estimation

In at least some embodiments, to perform motion estimation, the pipeline may include one instance of a motion estimation engine for each reference frame to be searched. Each motion estimation engine searches only one reference frame. In at least some embodiments, each motion estimation engine may include a low resolution motion estimation component, a full pixel motion estimation component, and a subpixel motion estimation component. In at least some embodiments, the three components of each of the motion estimation engines may be implemented at different stages of the pipeline. In at least some embodiments, each motion estimation engine may also include a memory component that reads and stores reference frame data from a memory as needed. In at least some embodiments, a single instance of a processor manages all instances of the motion estimation engine. In at least some embodiments, the processor may determine one or more candidates using predicted and co-located motion vectors and input the candidates to the full pixel motion estimation components of the motion estimation engines.

In at least some embodiments, the low resolution motion estimation component of each motion estimation engine performs an exhaustive search on a scaled-down, low resolution version of a respective reference frame to generate candidates. In at least some embodiments, the full pixel motion estimation component performs a search on full size pixels using candidates from the low resolution motion estimation component. In at least some embodiments, the subpixel motion estimation component performs a search on half and quarter pixels using best candidates received from the full pixel motion estimation component. In some embodiments, full pixel motion estimation and subpixel motion estimation may be disabled based on results of a direct mode estimation performed at an upstream stage of the pipeline. In at least some embodiments, each motion estimation engine outputs results data to mode decision 6020.

In at least some embodiments, motion estimation may also include a direct mode estimation component that receives co-located and spatial motion vector data and computes a direct/skip mode cost, which it provides to mode decision 6020. Based on the results, the direct mode estimation component may disable full pixel motion estimation and subpixel motion estimation.

Intra Estimation

In at least some embodiments, an intra estimation component of the pipeline performs intra mode selection to determine blocks of pixels already encoded within the current frame that may be used in encoding a current macroblock. In at least some embodiments, the intra estimation component performs intra mode selection only for luma. In these embodiments, chroma intra estimation is performed by a chroma reconstruction component at a downstream stage of the pipeline. In at least some embodiments, the intra estimation component may perform intra estimation independently for each of two or more blocks or partitions (e.g., 4×4, 8×8, 4×8, 8×4, 16×8, and/or 8×16 blocks) in a macroblock. For each block, prediction pixels are first extracted from neighbor blocks (neighbor blocks can be outside the current macroblock in the frame or within the current macroblock). For each prediction mode in the current block, the cost of the current mode is evaluated by creating a prediction block from neighbor pixels, computing a mode cost, and comparing the mode cost to a minimum cost for that block. Once all prediction modes are evaluated and the best mode is determined, reconstruction may be performed for the best mode so that reconstructed pixels can be used to predict future blocks within the macroblock. The intra estimation component may pass best intra mode information to mode decision 6020.

In at least some embodiments, macroblock input 6002 reads neighbor data from the bottom row of a previous quadrow from memory at quadrow boundaries and passes the neighbor data to the intra estimation component. In at least some embodiments, at least one downstream stage (e.g., a luma reconstruction component at a downstream stage) may pass neighbor data back to the intra estimation component.

Mode Decision

In at least some embodiments, mode decision 6020 may be implemented by a mode decision component at a stage of the pipeline that is downstream of the stage(s) that implement intra-frame and inter-frame estimation 6010 operations. However, in some embodiments, mode decision 6020 operations may be subdivided into two or more sub-operations that may be performed at one, two, or more stages of the pipeline, with one or more components or pipeline units at each stage configured to perform a particular sub-operation. In at least some embodiments, the mode decision 6020 component receives the best intra mode from intra estimation, direct/skip mode cost from direct mode estimation, and motion vector candidates from the motion estimation engines. In at least some embodiments, the mode decision component computes additional costs for bi-directional modes and determines the best macroblock type, including macroblock partitions, sub-partitions, prediction direction and reference frame indices. In at least some embodiments, the mode decision 6020 component also performs all motion vector prediction. The motion vector prediction results may be used when estimating motion vector rate during mode decision. In at least some embodiments, the motion vector prediction results may also be fed back from the mode decision 6020 component to motion estimation, for example for use in direct mode estimation and motion vector rate estimation.

Motion Compensation and Reconstruction

In at least some embodiments, motion compensation and reconstruction 6030 operations may be subdivided into two or more sub-operations that may be performed at one, two, or more stages of the pipeline, with one or more components or pipeline units at each stage configured to perform a particular sub-operation. For example, in some embodiments, motion compensation and reconstruction 6030 may be subdivided into luma motion compensation and reconstruction and chroma motion compensation and reconstruction. In at least some embodiments, each of these sub-operations of motion compensation and reconstruction 6030 may be performed by one or more components or pipeline units at one or more stages of the pipeline.

Luma Motion Compensation and Reconstruction

In at least some embodiments, a luma motion compensation component of the pipeline receives the best mode and corresponding motion vectors from mode decision 6020. As previously noted, each motion estimation engine may include a memory component that reads and stores reference frame data from a memory. If the best mode is inter-predicted, the luma motion compensation component requests reference frame macroblocks from the motion estimation engine corresponding to the motion vectors. The motion estimation engine returns subpixel interpolated 4×4 or 8×8 blocks depending on the request size. The luma motion compensation component then combines the blocks into prediction macroblocks. The luma motion compensation component then applies a weighted prediction to the prediction macroblocks to create the final macroblock predictor that is then passed to the luma reconstruction component.

In at least some embodiments, a luma reconstruction component of the pipeline performs macroblock reconstruction for luma, including intra prediction (in at least some embodiments, the luma motion compensation component performs inter prediction), forward transform and quantization (FTQ), and inverse transform and quantization (ITQ).

In at least some embodiments, based on the best mode from mode decision 6020, either an inter prediction macroblock is passed from the luma motion compensation component or intra prediction is performed by the luma reconstruction component to generate a prediction block. In intra mode, the prediction is performed in block (scan) order since reconstructed pixels from neighbor blocks are needed for prediction of future blocks. The input block is subtracted from the prediction block to generate a residual block. This residual pixel data is transformed and quantized by an FTQ technique implemented by the luma reconstruction component. The coefficient data is sent to an ITQ technique implemented by the luma reconstruction component, and may also be sent downstream to CAVLC encoding. The ITQ technique generates a reconstructed residual pixel block. The prediction block is added to the residual block to generate the reconstructed block. Reconstructed pixels may be passed downstream to a deblocking filter. In at least some embodiments, reconstructed pixels may also be fed back to an intra-frame estimation component of intra-frame and inter-frame estimation 6010 as feedback for use as neighbor data when processing subsequent macroblocks. In at least some embodiments, reconstructed pixels may also be passed back to an intra prediction neighbor pixel memory at the stage for use as neighbor pixels when predicting subsequent blocks inside the current macroblock at the stage.

Chroma Motion Compensation and Reconstruction

In at least some embodiments, chroma reconstruction is performed in two stages. In the first stage, chroma reference blocks needed for inter prediction are read from memory based on input macroblock type, motion vectors, and reference frame index. Subpixel interpolation and weighted prediction is then applied to generate a prediction macroblock. In the second stage, chroma intra prediction and chroma intra/inter FTQ/ITQ is performed. This allows one additional pipeline stage to load chroma prediction pixel data. Since chroma pixels are not searched by motion estimation, the chroma prediction data is read from external memory and may have large latency. In at least some embodiments, a chroma motion compensation component performs the first stage, while a chroma reconstruction component performs the second stage.

In at least some embodiments, the chroma motion compensation component generates a prediction block including subpixel interpolation for Cb and Cr chroma blocks; the size is based on the partition size and chroma formats. A full size chroma block is 8×8, 8×16, or 16×16 pixels for chroma formats 4:2:0, 4:2:2 and 4:4:4, respectively. In at least some embodiments, the chroma motion compensation component may prefetch and cache chroma prediction pixels from an external (to the pipeline) memory. In at least some embodiments, reference data may be read based on mode decision 6020 results. The chroma motion compensation component performs subpixel interpolation to generate a prediction block. Mode decision 6020 provides the macroblock type and sub-types, reference frame index per partition, and corresponding motion vectors. The prediction is output to the chroma reconstruction component.

In at least some embodiments, the chroma reconstruction component performs chroma prediction, chroma intra estimation and chroma reconstruction for inter and intra modes. For chroma formats 4:2:0 and 4:2:2, intra chroma estimation and prediction is performed. In at least some embodiments, chroma intra estimation is performed at this stage rather than at intra-frame and inter-frame estimation 6010 so that reconstructed pixels can be used during the estimation process. In at least some embodiments, if the best mode is in intra, intra chroma estimation may be performed. Based on the best intra chroma mode, intra prediction may be performed using one of four intra chroma modes. For inter macroblocks, inter chroma prediction pixels are received from chroma motion compensation. For chroma format 4:4:4, the luma intra prediction modes are used to generate the chroma block prediction, and inter chroma prediction is performed in the same manner as for luma. Therefore, chroma reconstruction conceptually includes 4:2:0 and 4:2:2 chroma reconstruction and luma reconstruction used to reconstruct chroma in 4:4:4 chroma format.

CAVLC Encode and Deblocking

In at least some embodiments, CAVLC encoding and deblocking may be performed by one or more components at a last stage of the pipeline. In at least some embodiments, a deblocking filter component of the pipeline receives reconstructed luma and chroma pixels from the chroma reconstruction component and performs deblocking filtering according to the H.264 Recommendation. Results may be output to a memory.

In at least some embodiments, a CAVLC encode component of the pipeline receives at least luma and chroma quantized coefficients, neighbor data, and chroma reconstruction results from the chroma reconstruction component and generates a CAVLC (context-adaptive variable-length coding) encoded output stream to a memory.

In at least some embodiments, the deblocking filter component and the CAVLC encode component write neighbor data for the bottom row of a quadrow to a memory at quadrow boundaries. For the top row of a next quadrow, macroblock input 6002 may then read this neighbor data from the memory at quadrow boundaries and pass the neighbor data to at least one downstream stage of the pipeline.

Transcoder

In at least some embodiments, a transcoding operation may be performed by a transcoder 6050. The transcoder may be implemented as a functional component of the pipeline or as a functional component that is external to the pipeline. In at least some embodiments, the transcoder 6050 may perform a memory-to-memory conversion of a CAVLC (context-adaptive variable-length coding) encoded stream output by the pipeline to a CABAC (context-adaptive binary arithmetic coding) encoded stream.

In at least some embodiments, the pipeline may encode in an order other than scan order, for example knight's order as previously described herein. However, ultimately, the H.264 video encoder's encoded bit stream should be transmitted in conventional macroblock scan order. In at least some embodiments, re-ordering the macroblock output from knight's order to scan order is accomplished by the CAVLC encode component writing encoded data to four different output buffers, each output buffer corresponding to a macroblock row. At the end of a quadrow, each row buffer will contain a scan order stream of encoded macroblocks for a respective row. Transcoder 6050 handles stitching the start and end of each row to generate a continuous stream at macroblock row boundaries. In at least some embodiments, the pipeline may embed metadata in the CAVLC output stream to facilitate stitching of the rows by the transcoder 6050.

Example Video Encoder Apparatus

FIG. 14 is a block diagram of an example video encoder apparatus 7000, according to at least some embodiments. The video encoder apparatus 7000 may, for example, be implemented as an integrated circuit (IC) or as a subsystem on an IC such as a system-on-a-chip (SOC). In at least some embodiments, the video encoder apparatus 7000 may include a pipeline 7040 component, a processor 7010 component (e.g., a low-power multicore processor), a memory management unit (MMU) 7020, DMA 7030, and an interconnect 7050 such as a bus subsystem or fabric that interconnects the functional components of the apparatus. The processor 7010 component of the video encoder apparatus 7000 may, for example, perform frame-level control of the pipeline 7040 such as rate control, perform pipeline 7040 configuration including configuration of individual pipeline units within the pipeline 7040, and interface with application software via a driver, for example for video encoder 7000 configuration. The MMU 7020 may serve as an interface to external memory, for example for streaming video input and/or output. Pipeline 7040 component may access memory through MMU 7020 via DMA 7030. In some embodiments, the video encoder apparatus 7000 may include other functional components or units not shown in FIG. 14, or fewer functional components than those shown in FIG. 17. An example block processing method that may be implemented by pipeline 7040 component is shown in FIG. 13. An example a system-on-a-chip (SOC) that may include at least one video encoder apparatus 7000 is illustrated in FIG. 15.

Example System on a Chip (SOC)

Turning now to FIG. 15, a block diagram of one embodiment of a system-on-a-chip (SOC) 8000 that may include at least one instance of a video encoder apparatus including a block processing pipeline that may implement one or more of the block processing methods and apparatus as illustrated in FIGS. 3 through 14. SOC 8000 is shown coupled to a memory 8800. As implied by the name, the components of the SOC 8000 may be integrated onto a single semiconductor substrate as an integrated circuit "chip." In some embodiments, the components may be implemented on two or more discrete chips in a system. However, the SOC 8000 will be used as an example herein. In the illustrated embodiment, the components of the SOC 8000 include a central processing unit (CPU) complex 8020, on-chip peripheral components 8040A-8040B (more briefly, "peripherals"), a memory controller (MC) 8030, a video encoder 7000 (which may itself be considered a peripheral component), and a communication fabric 8010. The components 8020, 8030, 8040A-8040B, and 7000 may all be coupled to the communication fabric 8010. The memory controller 8030 may be coupled to the memory 8800 during use, and the peripheral 8040B may be coupled to an external interface 8900 during use. In the illustrated embodiment, the CPU complex 8020 includes one or more processors (P) 8024 and a level two (L2) cache 8022.

The peripherals 8040A-8040B may be any set of additional hardware functionality included in the SOC 8000. For example, the peripherals 8040A-8040B may include video peripherals such as an image signal processor configured to process image capture data from a camera or other image sensor, display controllers configured to display video data on one or more display devices, graphics processing units (GPUs), video encoder/decoders, scalers, rotators, blenders, etc. The peripherals may include audio peripherals such as microphones, speakers, interfaces to microphones and speakers, audio processors, digital signal processors, mixers, etc. The peripherals may include peripheral interface controllers for various interfaces 8900 external to the SOC 8000 (e.g. the peripheral 8040B) including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

More particularly in FIG. 15, SOC 8000 may include at least one instance of a video encoder 7000 component, for example a video encoder 7000 as illustrated in FIG. 14 that includes a block processing pipeline 7040 component that implements a block processing method 6000 as illustrated in FIG. 13. Video encoder 7000 may be an H.264 video encoder apparatus that may be configured to convert input video frames from an input format into H.264/Advanced Video Coding (AVC) format as described in the H.264/AVC standard. The block processing pipeline 7040 may implement one or more of the block processing methods and apparatus as described herein in relation to FIGS. 3 through 13.

The CPU complex 8020 may include one or more CPU processors 8024 that serve as the CPU of the SOC 8000. The CPU of the system includes the processor(s) that execute the main control software of the system, such as an operating system. Generally, software executed by the CPU during use may control the other components of the system to realize the desired functionality of the system. The processors 8024 may also execute other software, such as application programs. The application programs may provide user functionality, and may rely on the operating system for lower level device control. Accordingly, the processors 8024 may also be referred to as application processors. The CPU complex 8020 may further include other hardware such as the L2 cache 8022 and/or and interface to the other components of the system (e.g. an interface to the communication fabric 8010). Generally, a processor may include any circuitry and/or microcode configured to execute instructions defined in an instruction set architecture implemented by the processor. The instructions and data operated on by the processors in response to executing the instructions may generally be stored in the memory 8800, although certain instructions may be defined for direct processor access to peripherals as well. Processors may encompass processor cores implemented on an integrated circuit with other components as a system on a chip (SOC 8000) or other levels of integration. Processors may further encompass discrete microprocessors, processor cores and/or microprocessors integrated into multichip module implementations, processors implemented as multiple integrated circuits, etc.

The memory controller 8030 may generally include the circuitry for receiving memory operations from the other components of the SOC 8000 and for accessing the memory 8800 to complete the memory operations. The memory controller 8030 may be configured to access any type of memory 8800. For example, the memory 8800 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.). The memory controller 8030 may include queues for memory operations, for ordering (and potentially reordering) the operations and presenting the operations to the memory 8800. The memory controller 8030 may further include data buffers to store write data awaiting write to memory and read data awaiting return to the source of the memory operation. In some embodiments, the memory controller 8030 may include a memory cache to store recently accessed memory data. In SOC implementations, for example, the memory cache may reduce power consumption in the SOC by avoiding reaccess of data from the memory 8800 if it is expected to be accessed again soon. In some cases, the memory cache may also be referred to as a system cache, as opposed to private caches such as the L2 cache 8022 or caches in the processors 8024, which serve only certain components. Additionally, in some embodiments, a system cache need not be located within the memory controller 8030.

In an embodiment, the memory 8800 may be packaged with the SOC 8000 in a chip-on-chip or package-on-package configuration. A multichip module configuration of the SOC 8000 and the memory 8800 may be used as well. Such configurations may be relatively more secure (in terms of data observability) than transmissions to other components in the system (e.g. to the end points 16A-16B). Accordingly, protected data may reside in the memory 8800 unencrypted, whereas the protected data may be encrypted for exchange between the SOC 8000 and external endpoints.

The communication fabric 8010 may be any communication interconnect and protocol for communicating among the components of the SOC 8000. The communication fabric 8010 may be bus-based, including shared bus configurations, cross bar configurations, and hierarchical buses with bridges. The communication fabric 8010 may also be packet-based, and may be hierarchical with bridges, cross bar, point-to-point, or other interconnects.

It is noted that the number of components of the SOC 8000 (and the number of subcomponents for those shown in FIG. 15, such as within the CPU complex 8020) may vary from embodiment to embodiment. There may be more or fewer of each component/subcomponent than the number shown in FIG. 15

Example System

Figure 16:
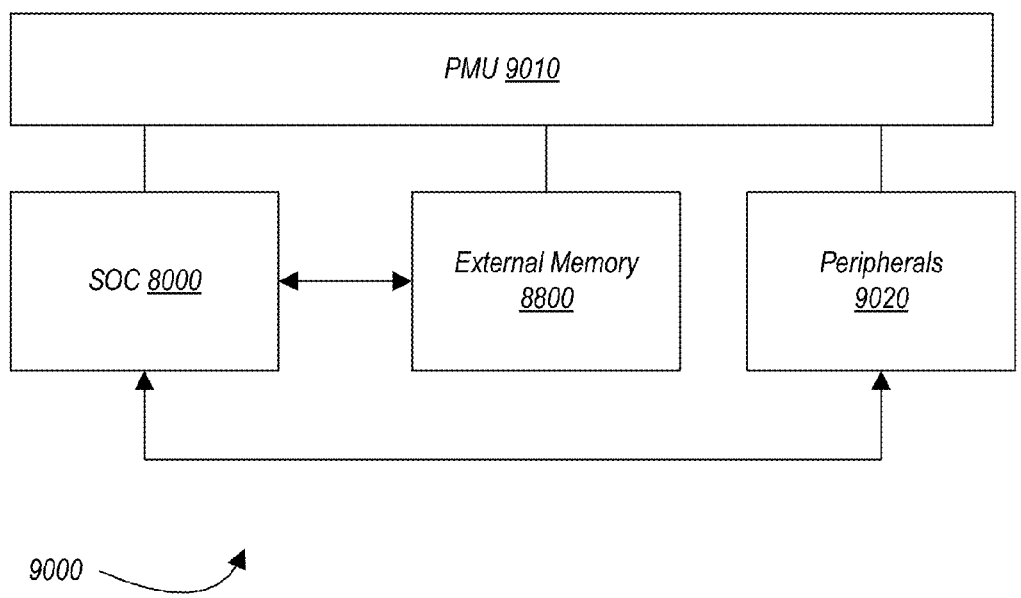
FIG. 16 is a block diagram of one embodiment of a system.

FIG. 16 a block diagram of one embodiment of a system 9000. In the illustrated embodiment, the system 9000 includes at least one instance of the SOC 8000 coupled to one or more external peripherals 9020 and the external memory 8800. A power management unit (PMU) 9010 is provided which supplies the supply voltages to the SOC 8000 as well as one or more supply voltages to the memory 8800 and/or the peripherals 9020. In some embodiments, more than one instance of the SOC 8000 may be included (and more than one memory 8800 may be included as well).

The peripherals 9020 may include any desired circuitry, depending on the type of system 9000. For example, in one embodiment, the system 9000 may be a mobile device (e.g. personal digital assistant (PDA), smart phone, etc.) and the peripherals 9020 may include devices for various types of wireless communication, such as wifi, Bluetooth, cellular, global positioning system, etc. The peripherals 9020 may also include additional storage, including RAM storage, solid state storage, or disk storage. The peripherals 9020 may include user interface devices such as a display screen, including touch display screens or multitouch display screens, keyboard or other input devices, microphones, speakers, etc. In other embodiments, the system 9000 may be any type of computing system (e.g. desktop personal computer, laptop, workstation, net top etc.).

The external memory 8800 may include any type of memory. For example, the external memory 8800 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 8800 may include one or more memory modules to which the memory devices are mounted, such as single inline memory modules (SIMMs), dual inline memory modules (DIMMs), etc. Alternatively, the external memory 8800 may include one or more memory devices that are mounted on the SOC 8000 in a chip-on-chip or package-on-package implementation.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An apparatus, comprising:
one or more processors or circuitry implementing a block processing pipeline configured to process macroblocks of pixels from a current frame passing through the pipeline, wherein the pipeline includes a plurality of stages each configured to perform one or more operations on a macroblock currently at the respective stage, wherein each macroblock includes at least one block of luma elements and at least one block of chroma elements, wherein the plurality of stages comprises:
one or more luma processing stages implemented by at least a portion of the one or more processors or circuitry and configured to process luma elements of the macroblocks to generate results including a best mode for each macroblock, wherein the best mode is one of an intra-frame mode or an inter-frame mode; and
a chroma reconstruction stage downstream to the one or more luma processing stages, wherein the chroma reconstruction stage is implemented by at least a portion of the one or more processors or circuitry and is configured to, for at least one macroblock:
determine that the best mode received from the one or more luma processing stages is an intra-frame mode;
perform intra-frame estimation for the chroma elements of the macroblock to determine one of a plurality of chroma intra-frame modes as a best chroma intra-frame mode for the macroblock; and
perform chroma reconstruction for the macroblock according to the determined best chroma intra-frame mode.

2. The apparatus as recited in claim 1, wherein the plurality of stages further comprises a chroma motion compensation stage downstream to the one or more luma processing stages and upstream to the chroma reconstruction stage and configured to perform motion compensation for chroma elements of each macroblock with respect to one or more previously processed reference frames and according to the results of the one or more luma processing stages to generate a chroma inter-frame prediction block for each macroblock.

3. The apparatus as recited in claim 2, wherein the chroma reconstruction stage is further configured to, for at least one other macroblock:
determine that the best mode received from the one or more luma processing stages is an inter-frame mode; and
perform chroma reconstruction for the macroblock according to the chroma inter-frame prediction block generated by the chroma motion compensation stage.

4. The apparatus as recited in claim 2, wherein the one or more luma processing stages include:
a motion estimation stage configured to:
perform intra-frame estimation to determine a best intra-frame mode for each macroblock according to luma elements from the current frame; and
perform inter-frame estimation to determine a best inter-frame mode for each macroblock according to luma elements from one or more previously processed reference frames; and
a mode decision stage configured to determine the best mode for each macroblock according to the best intra-frame mode and the best inter-frame mode determined by the motion estimation stage and pass the determined best mode to one or more downstream stages.

5. The apparatus as recited in claim 4, wherein the one or more luma processing stages further include a luma motion compensation stage and a luma reconstruction stage downstream to the mode decision stage and upstream to the chroma motion compensation stage, wherein the luma motion compensation stage and the luma reconstruction stage are configured to perform motion compensation and reconstruction of luma elements for each macroblock according to results of the mode decision stage.

6. The apparatus as recited in claim 5, wherein the luma reconstruction stage is configured to feedback reconstructed luma elements to the motion estimation stage for use in performing intra-frame estimation for other luma content.

7. The apparatus as recited in claim 1, wherein the current frame is subdivided into rows of macroblocks, wherein the apparatus is configured to input the macroblocks to the block processing pipeline so that adjacent macroblocks on a row are not concurrently at adjacent stages of the pipeline.

8. A method, comprising:
performing, by one or more computing devices:
inputting macroblocks of pixels from a current frame to a block processing pipeline implemented by one or more processors or circuitry, wherein the pipeline includes a plurality of stages each configured to perform one or more operations on a macroblock, and wherein each macroblock includes at least one block of luma elements and at least one block of chroma elements;
processing, by one or more luma processing stages implemented by at least a portion of the one or more processors or circuitry, luma elements of the macroblocks to generate results including a best mode for each macroblock, wherein the best mode is one of an intra-frame mode or an inter-frame mode;
performing, by a chroma reconstruction stage implemented by at least a portion of the one or more processors or circuitry and downstream to the one or more luma processing stages, for at least one macroblock:
determining that the best mode received from the one or more luma processing stages is an intra-frame mode;
performing intra-frame estimation for the chroma elements of the macroblock to determine one of a plurality of chroma intra-frame modes as a best chroma intra-frame mode for the macroblock; and
performing chroma reconstruction for the macroblock according to the determined best chroma intra-frame mode; and
outputting the processed macroblocks to a memory.

9. The method as recited in claim 8, further comprises performing, by a chroma motion compensation stage downstream to the one or more luma processing stages and upstream to the chroma reconstruction stage, motion compensation for chroma elements of each macroblock with respect to one or more previously processed reference frames and according to the results of the one or more luma processing stages to generate a chroma inter-frame prediction block for each macroblock.

10. The method as recited in claim 9, further comprising performing, by the chroma reconstruction stage, for at least one other macroblock:
determining that the best mode received from the one or more luma processing stages is an inter-frame mode; and
performing chroma reconstruction for the macroblock according to the chroma inter-frame prediction block generated by the chroma motion compensation stage.

11. The method as recited in claim 9, wherein said processing by the one or more luma processing stages comprises:

performing, by a motion estimation stage, intra-frame estimation to determine a best intra-frame mode for each macroblock according to luma elements from the current frame;
performing, by the motion estimation stage, inter-frame estimation to determine a best inter-frame mode for each macroblock according to luma elements from one or more previously processed reference frames;
determining, by a mode decision stage, the best mode for each macroblock according to the best intra-frame mode and the best inter-frame mode determined by the motion estimation stage; and
passing the determined best mode to one or more downstream stages.

12. The method as recited in claim 11, wherein said processing by the one or more luma processing stages further comprises performing, by a luma motion compensation stage and a luma reconstruction stage downstream to the mode decision stage and upstream to the chroma motion compensation stage, motion compensation and reconstruction of luma elements for each macroblock according to results of the mode decision stage.

13. The method as recited in claim 12, further comprising the luma reconstruction stage feeding back reconstructed luma elements to the motion estimation stage for use in performing intra-frame estimation for other luma content.

14. The method as recited in claim 8, wherein the current frame is subdivided into rows of macroblocks, wherein said inputting the macroblocks spaces the macroblocks in the pipeline so that adjacent macroblocks on a row are not concurrently at adjacent stages of the pipeline.

15. A device, comprising:
a memory; and
an apparatus configured to process video frames and to store the processed video frames as frame data to the memory, the apparatus comprising one or more processors or circuitry implementing a block processing pipeline that implements a plurality of stages each configured to perform one or more operations on a macroblock of pixels from a frame passing through the pipeline, wherein each macroblock includes at least one block of luma elements and at least one block of chroma elements;
wherein one or more luma processing stages of the one or more processors or circuitry implementing the pipeline are configured to process luma elements of the macroblocks to generate results including a best mode for each macroblock, wherein the best mode is one of an intra-frame mode or an inter-frame mode;
wherein a chroma motion compensation stage of the one or more processors or circuitry implementing the pipeline and downstream to the one or more luma processing stages is configured to perform motion compensation for chroma elements of the macroblocks to generate a chroma inter-frame prediction block for each macroblock; and
wherein a chroma reconstruction stage of the one or more processors or circuitry implementing the pipeline and downstream to the chroma motion compensation stage is configured to:
for each macroblock for which the best mode received from the one or more luma processing stages is an intra-frame mode:
perform intra-frame estimation for the chroma elements of the macroblock to determine a best chroma intra-frame mode for the macroblock; and perform chroma reconstruction for the macroblock according to the determined best chroma intra-frame mode;

for each macroblock for which the best mode received from the one or more luma processing stages is an inter-frame mode, perform chroma reconstruction for the macroblock according to the chroma inter-frame prediction block generated by the chroma motion compensation stage.

16. The device as recited in claim 15, wherein the chroma motion compensation stage is configured to perform the motion compensation with respect to one or more previously processed reference frames and according to the results of the one or more luma processing stages.

17. The device as recited in claim 16, wherein the one or more luma processing stages include:

a motion estimation stage configured to:
perform intra-frame estimation to determine a best intra-frame mode for each macroblock according to luma elements from the frame; and
perform inter-frame estimation to determine a best inter-frame mode for each macroblock according to luma elements from one or more previously processed reference frames; and a mode decision stage configured to determine the best mode for each macroblock according to the best intra-frame mode and the best inter-frame mode determined by the motion estimation stage and pass the determined best mode to one or more downstream stages.

18. The device as recited in claim 17, wherein the one or more luma processing stages further include a luma motion compensation stage and a luma reconstruction stage downstream to the mode decision stage and upstream to the chroma motion compensation stage, wherein the luma motion compensation stage and the luma reconstruction stage are configured to perform motion compensation and reconstruction of luma elements for each macroblock according to results of the mode decision stage.

19. The device as recited in claim 18, wherein the luma reconstruction stage is configured to feedback reconstructed luma elements to the motion estimation stage for use in performing intra-frame estimation for other luma content.

20. The device as recited in claim 15, wherein each frame is subdivided into rows and columns of macroblocks of pixels, wherein the apparatus is configured to input the macroblocks of pixels from the frame to the block processing pipeline so that adjacent macroblocks on a row are not concurrently at adjacent stages of the pipeline.

* * * * *